United States Patent
Dai et al.

(10) Patent No.: US 12,412,601 B1
(45) Date of Patent: Sep. 9, 2025

(54) ACTIVE HUMIDITY CONTROL USING CHEMICAL MIXTURES IN DATA STORAGE DEVICES

(71) Applicant: Western Digital Technologies, Inc., San Jose, CA (US)

(72) Inventors: Qing Dai, San Jose, CA (US); Ruihua Li, Cupertino, CA (US); Tan Trinh, San Jose, CA (US); Yuichi Aoki, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 56 days.

(21) Appl. No.: 18/597,460

(22) Filed: Mar. 6, 2024

(51) Int. Cl.
  *G11B 33/14* (2006.01)
  *G11B 5/00* (2006.01)

(52) U.S. Cl.
  CPC .... *G11B 33/144* (2013.01); *G11B 2005/0024* (2013.01)

(58) Field of Classification Search
  None
  See application file for complete search history.

(56) References Cited

U.S. PATENT DOCUMENTS

| | | | |
|---|---|---|---|
| 4,967,295 A * | 10/1990 | Yamauchi | B01D 53/26 360/99.18 |
| 5,293,286 A * | 3/1994 | Hasegawa | G11B 33/1453 |
| 5,650,890 A * | 7/1997 | Kuroki | G11B 33/1453 |
| 6,000,121 A * | 12/1999 | Kuroki | G11B 33/1453 29/603.03 |
| 7,695,547 B2 * | 4/2010 | Smith | B01D 53/28 360/97.12 |
| 8,599,515 B2 | 12/2013 | Brown | |
| 8,867,164 B2 * | 10/2014 | Brown | G11B 25/043 360/97.16 |
| 10,468,071 B1 | 11/2019 | Tasaka et al. | |
| 10,734,035 B1 * | 8/2020 | Sun | G11B 33/1453 |
| 10,950,266 B1 | 3/2021 | Rajauria et al. | |
| 2006/0066974 A1 * | 3/2006 | Akamatsu | G11B 33/14 360/97.12 |
| 2006/0086813 A1 * | 4/2006 | Beatty | G11B 33/1453 |
| 2008/0180835 A1 * | 7/2008 | Strom | G11B 25/043 |
| 2013/0114163 A1 * | 5/2013 | Brown | B01D 53/0407 |
| 2019/0318767 A1 * | 10/2019 | Brand | G06F 1/182 |

FOREIGN PATENT DOCUMENTS

| | | | |
|---|---|---|---|
| JP | H02287997 A | * | 11/1990 |
| JP | 2005084018 A | * | 3/2005 |

* cited by examiner

Primary Examiner — William J Klimowicz

(57) ABSTRACT

A method of adjusting a humidity within an interior of an enclosure of a data storage device comprises detecting a trigger condition, and, in response to detecting the trigger condition, mixing together two or more chemicals or combinations of chemicals situated within the interior of the enclosure of the data storage device to create a water-releasing substance, and the water-releasing substance releasing water, thereby increasing the humidity within the interior of the enclosure of the data storage device. A data storage device comprises a mixing device configured to mix two or more chemicals or combinations of chemicals to provoke a chemical reaction that releases water; and a controller configured to cause the mixing device to mix the two or more chemicals or combinations of chemicals.

24 Claims, 11 Drawing Sheets

| 0% humidity | 3% humidity | -3% humidity |
|---|---|---|
| Sodium percarbonate 26 mg + 75% $CaO_2$ 24 mg | Sodium percarbonate 29 mg + 75% $CaO_2$ 21 mg | Sodium percarbonate 23 mg + 75% $CaO_2$ 26 mg |

FIG. 9

ACTIVE HUMIDITY CONTROL USING CHEMICAL MIXTURES IN DATA STORAGE DEVICES

CROSS-REFERENCE TO RELATED APPLICATIONS

This application is being filed on the same day as, and hereby incorporates by reference in its entirety for all purposes, U.S. patent application Ser. No. 18/597,401, entitled "ACTIVE HUMIDITY CONTROL USING HEAT-RESPONSIVE WATER-RELEASING SUBSTANCES IN DATA STORAGE DEVICES".

BACKGROUND

Data storage systems are used to store large amounts of information. A data storage system typically includes a read/write transducer for retrieving information from and storing information on a media. Some data storage devices, such as hard disk drives, use rotating magnetic disks (also referred to as platters or media). Small magnetic domains on the media that represent binary data (0s and 1s) are created on the surface of a rotating platter coated with a magnetic material. To write to the media, the write portion of the read/write transducer generates a magnetic field, which aligns the magnetic domains on the media's surface to represent a 0 or a 1. This process magnetizes the tiny regions on the media, thereby encoding the data. When data needs to be retrieved, the read portion of the read/write transducer senses the magnetic orientation of the domains as the media spins. As the domains pass under the read head, they induce a small electrical current in the coil, which is then translated into the binary data.

In some data storage systems, a suspended slider supports a head that includes the read/write transducer. The slider provides mechanical support for the head and the electrical connections between the head and the rest of the data storage system. When the data storage system is in operation, the slider floats a small distance above the recording medium (e.g., a hard disk in a hard disk drive), which rotates at high speeds. Components of the data storage system move the slider and, therefore, the head to a desired radial position over the surface of the rotating medium, and the head reads or writes information. The slider rides on a cushion or bearing of air or gas created above the surface of the medium as the disk rotates at its operating speed. The slider has an air-bearing surface (ABS) that faces the medium. The ABS is designed to generate an air-bearing force that counteracts a preload bias that pushes the slider toward the medium. The ABS causes the slider to fly above and out of contact with the medium.

Manufacturers of data storage systems typically take steps to ensure that the internal components of hard drives are not adversely affected by humidity. For example, the materials used in the construction of hard disk drives may be selected for their resistance to humidity and corrosion to help protect the internal components from the effects of moisture. Hard disk drives are usually sealed in an airtight enclosure to prevent external contaminants, including moisture, from entering the drive. In addition, hard disk drives are generally assembled in controlled environments with regulated temperature and humidity levels to ensure that the drives are not exposed to excessive moisture during the manufacturing process. All of these practices are geared toward providing a stable head-disk interface, so that sliders can fly stably above the medium during its life.

SUMMARY

This summary represents non-limiting embodiments of the disclosure.

Disclosed herein are techniques for adjusting (e.g., increasing) the humidity within a data storage device. In contrast to conventional approaches, which generally use passive means, such as desiccants, aimed at reducing humidity, the disclosed techniques allow the humidity to be increased as the data storage device operates. For example, the humidity can be increased in response to a trigger that indicates higher humidity would be useful or desirable (e.g., to provide lubrication when the recording head remains on (over) the same track for a relatively long period of time, after the data storage device has been in operation or writing for a specified amount of time, etc.).

In some aspects, the techniques described herein relate to a method of adjusting a humidity within an interior of an enclosure of a data storage device, the method including: detecting a trigger condition; in response to detecting the trigger condition, mixing together two or more chemicals or combinations of chemicals situated within the interior of the enclosure of the data storage device to create a water-releasing substance; and the water-releasing substance releasing water, thereby increasing the humidity within the interior of the enclosure of the data storage device.

In some aspects, the techniques described herein relate to a method, wherein the trigger condition is that a particular amount of time has passed.

In some aspects, the techniques described herein relate to a method, wherein the particular amount of time is an amount of time that (a) the data storage device has been in operation, or (b) a laser of a heat-assisted magnetic recording (HAMR) head has been in operation.

In some aspects, the techniques described herein relate to a method, wherein the trigger condition includes one or more of: a recording head of the data storage device has remained or will remain over a single track of a recording media of the data storage device for a threshold amount of time, an ATI refresh command or operation, a formatting command or operation, the humidity within the interior of the enclosure of the data storage device is below a threshold, or a command or instruction.

In some aspects, the techniques described herein relate to a method, wherein at least one of the two or more chemicals or combinations of chemicals includes at least one of: an acid, a carbonate, a base, a hydroxide, a hydrogen-containing material, a reactant that gives up a hydroxyl group in a synthesis of a new product, or an oxide.

In some aspects, the techniques described herein relate to a method, wherein the two or more chemicals or combinations of chemicals include sodium percarbonate ($Na_2CO_3 \cdot 1.5H_2O_2$) and calcium peroxide ($CaO_2$).

In some aspects, the techniques described herein relate to a method, wherein the two or more chemicals or combinations of chemicals include (a) $CuSO_4 \cdot 3H_2O$ and (b) $CuSO_4 \cdot 2H_2O$ or $CuSO_4 \cdot H_2O$.

In some aspects, the techniques described herein relate to a method, wherein the two or more chemicals or combinations of chemicals include $Na_2B_4O_7 \cdot 7H_2O$.

In some aspects, the techniques described herein relate to a method, further including: monitoring for the trigger condition.

In some aspects, the techniques described herein relate to a method, wherein monitoring for the trigger condition includes at least one of: measuring or estimating a current humidity within the interior of the enclosure, monitoring a service time of the data storage device, monitoring an operation time of a laser of a heat-assisted magnetic recording (HAMR) head of the data storage device, monitoring a communication channel for an instruction, or reading a register.

In some aspects, the techniques described herein relate to a data storage device, including: a mixing device configured to mix two or more chemicals or combinations of chemicals to provoke a chemical reaction that releases water; and a controller configured to, in response to an occurrence of a trigger condition, cause the mixing device to mix the two or more chemicals or combinations of chemicals to provoke the chemical reaction that releases water, thereby increasing a humidity within the data storage device.

In some aspects, the techniques described herein relate to a data storage device, wherein the two or more chemicals or combinations of chemicals include at least one of: an acid, a carbonate, a base, a hydroxide, a hydrogen-containing material, a reactant that gives up a hydroxyl group in a synthesis of a new product, or an oxide.

In some aspects, the techniques described herein relate to a data storage device, wherein the two or more chemicals or combinations of chemicals include at least one of sodium percarbonate ($Na_2CO_3 \cdot 1.5H_2O_2$), calcium peroxide ($CaO_2$), or magnesium peroxide ($MgO_2$).

In some aspects, the techniques described herein relate to a data storage device, wherein the two or more chemicals or combinations of chemicals include sodium percarbonate ($Na_2CO_3 \cdot 1.5H_2O_2$) and calcium peroxide ($CaO_2$).

In some aspects, the techniques described herein relate to a data storage device, wherein the two or more chemicals or combinations of chemicals include (a) $CuSO_4 \cdot 3H_2O$ and (b) $CuSO_4 \cdot 2H_2O$ or $CuSO_4 \cdot H_2O$.

In some aspects, the techniques described herein relate to a data storage device, wherein the two or more chemicals or combinations of chemicals include $Na_2B_4O_7 \cdot 7H_2O$.

In some aspects, the techniques described herein relate to a data storage device, wherein the trigger condition includes passage of a specified amount of time.

In some aspects, the techniques described herein relate to a data storage device, wherein the specified amount of time is an amount of time the data storage device is in service, and wherein the controller is further configured to determine the amount of time the data storage device is in service.

In some aspects, the techniques described herein relate to a data storage device, wherein the specified amount of time is an operation time of a laser of a heat-assisted magnetic recording (HAMR) head of the data storage device, and wherein the controller is further configured to determine the operation time of a laser of a heat-assisted magnetic recording (HAMR) head of the data storage device.

In some aspects, the techniques described herein relate to a data storage device, wherein the trigger condition includes occurrence of a command, and wherein the controller is further configured to detect or issue the command.

In some aspects, the techniques described herein relate to a data storage device, wherein the command includes an adjacent track interference (ATI) refresh command.

In some aspects, the techniques described herein relate to a data storage device, wherein the trigger condition includes a humidity within an interior of the data storage device being below a threshold, and further including a sensor coupled to the controller, wherein the sensor is configured to detect the humidity within the interior of the data storage device.

In some aspects, the techniques described herein relate to a data storage device, further including: a water-absorbing material.

In some aspects, the techniques described herein relate to a data storage device, wherein the water-absorbing material includes at least one of a desiccant, calcium peroxide ($CaO_2$), magnesium peroxide ($MgO_2$), sodium peroxide ($Na_2O_2$), or a hydrogel.

BRIEF DESCRIPTION OF THE DRAWINGS

Objects, features, and advantages of the disclosure will be readily apparent from the following description of certain embodiments taken in conjunction with the accompanying drawings in which:

FIG. 9 is a table showing examples of amounts and ratios of sodium percarbonate and $CaO_2$ that can be mixed in a container to provide various relative humidity levels in accordance with some embodiments.

Figure 1:
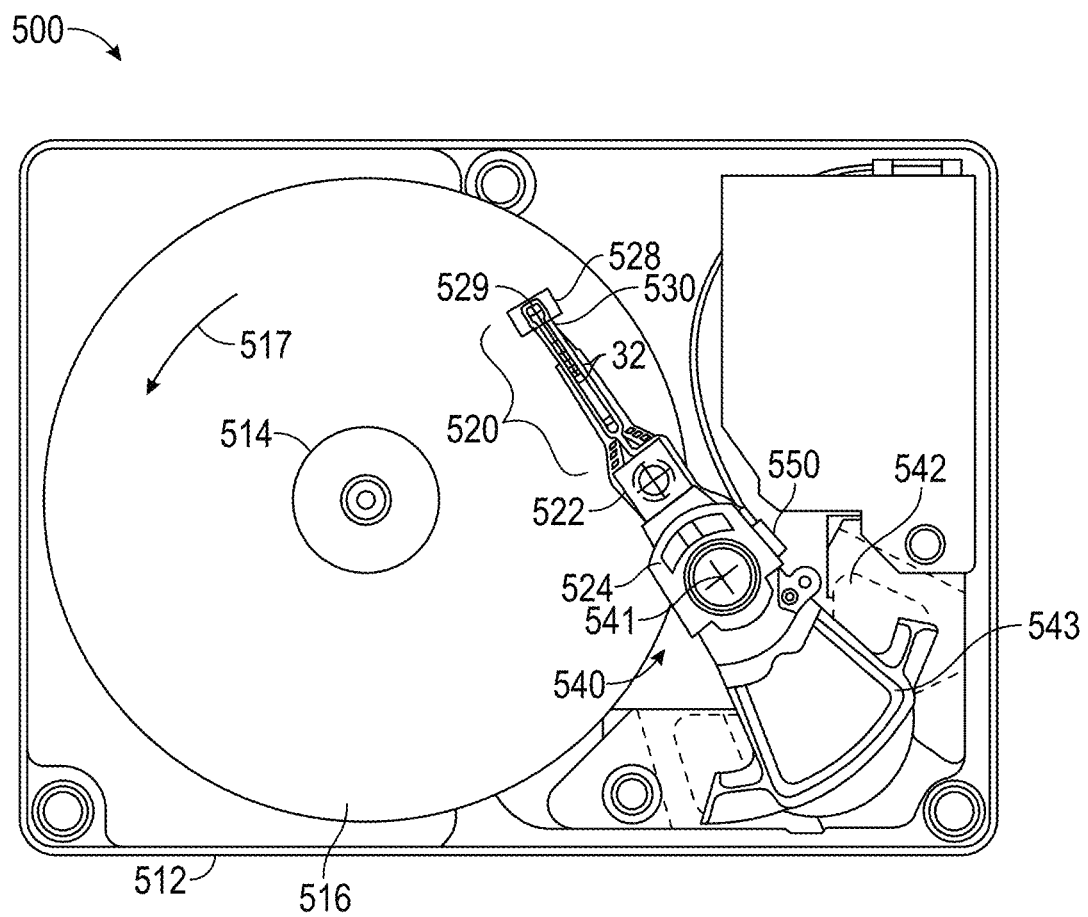
FIG. 1 is a top view of an example of a data storage device into which embodiments disclosed herein can be incorporated.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Described herein are methods of adjusting the humidity within a data storage device, and data storage devices that include components to allow the humidity to be controlled. The disclosed techniques allow the humidity to be increased temporarily, typically for a very short period of time, when it is desirable to do so (e.g., to provide lubrication when the recording head remains on (over) the same track for a relatively long period of time). The additional moisture that is released can be absorbed by a desiccant and/or other material(s) in the data storage device to allow the data storage device's internal environment to return (e.g., over time, such as several hours) to a lower relative humidity condition.

In some embodiments, the techniques use a heat-responsive water-releasing substance (also referred to as a heat-responsive water-releasing material) that releases water in response to being heated. The heat-responsive water-releasing substance, which may be a single substance that releases water or a combination of substances that together release water, is included in the data storage device at the time of manufacture. As the data storage device operates, a heater inside of the data storage device is selectively activated (controlled) to cause the heat-responsive water-releasing substance to release water substantially on demand, thereby providing a way to selectively adjust the relative humidity inside of the data storage device. The heater can be specifically provided for humidity control, or an existing component of the data storage device (e.g., a voice coil motor winding) can be used to selectively heat the heat-responsive water-releasing substance and cause it to release water. By controlling the amount of the heat-responsive water-releasing substance included in the data storage device and the amount and duration of applied heat, the humidity inside of the data storage device can be adjusted precisely enough to provide some or all of the benefits described herein.

In some embodiments, the techniques use two or more chemicals that, when mixed together, release water. There are many potential mixtures that can be provided, some of which can occur at a variety of temperatures. Depending on the selected chemicals, the amounts of those chemicals included in the data storage device, and the rate at which the chemicals are mixed, the amount and rate of water released can be controlled. In some embodiments, mixtures of chemicals release water at the temperatures expected to be present within the data storage device as it operates normally, such that merely mixing the chemicals causes water to be released. In some embodiments, a heater can be used to provide an additional way to control the rate of the chemical reaction.

FIG. 1 is a top view of an example of a data storage device 500 into which embodiments disclosed herein can be incorporated. FIG. 1 illustrates a head/disk assembly of the data storage device 500 with the cover removed. The data storage device 500 includes a rigid base 512 supporting a spindle 514 that supports a recording media 516 (or multiple recording media 516). The spindle 514 is rotated by a spindle motor, which, in operation, rotates the recording media 516 in the direction shown by the curved arrow 517. The data storage device 500 has at least one load beam assembly 520 having an integrated lead suspension (ILS) or flexure 530 with an array 32 of electrically conductive interconnect traces or lines. The at least one load beam assembly 520 is attached to rigid arms 522 connected to an E-shaped support structure, sometimes called an E-block 524. The flexure 530 is attached to a slider 528, which is typically formed of a composite material, such as a composite of alumina/titanium-carbide ($Al_2O_3$/TiC).

A recording head 529 for recording data (e.g., bits) to and reading data from a recording media 516 is located at the end or trailing surface of the slider 528. The recording head 529 comprises a read portion for reading from the recording media 516 and a write portion for writing to the recording media 516. FIG. 1 illustrates only one recording media 516 surface with the slider 528 and recording head 529, but there may be multiple recording media 516 stacked on a hub that is rotated by the spindle motor, with a separate slider 528 and recording head 529 associated with each surface of each recording media 516.

As the recording media 516 rotates, the recording media 516 drags gas (which may be air, helium, etc.) under the slider 528 in a direction approximately parallel to the tangential velocity of the recording media 516. The slider 528 has a media-facing air-bearing surface (ABS) that causes the slider 528 to ride on a cushion or bearing of gas, typically air, mostly helium, or hydrogen, generated by rotation of the recording media 516. (It is to be understood that the term "air-bearing surface (ABS)" is used herein to refer to the gas-bearing surface of a slider, regardless of whether the gas within the drive is air or another gas (e.g., predominantly helium) or a mixture of gases.) As the air or gas passes under the slider 528 ABS, compression of the air or gas along the air flow path causes the air pressure between the recording media 516 and the slider 528 to increase, which creates a hydrodynamic lifting force that counteracts the tendency of the at least one load beam assembly 520 to push the slider 528 toward the recording media 516. The slider 528 thus flies above the recording media 516 but in close proximity to the surface of the recording media 516. The flexure 530 enables the slider 528 to "pitch" and "roll" on the air (or gas) bearing generated by the recording media 516 as it rotates. Thus, during normal operation, the recording head 529 remains slightly above the surface of the recording media 516, riding on the air bearing.

The data storage device 500 of FIG. 1 also includes a rotary actuator assembly 540 rotationally mounted to the rigid base 512 at a pivot point 541. The rotary actuator assembly 540 may include a voice coil motor (VCM) actuator that includes a magnet assembly 542 fixed to the rigid base 512 and a voice coil 543. The voice coil 543 is a coil of wire attached to the recording head 529 assembly. It is situated within the magnetic field of the magnet assembly 542. The voice coil 543 is mounted on the rotary actuator assembly 540. As the electric current varies in the voice coil 543, the resulting magnetic field interacts with the magnet assembly 542, causing a force that moves the entire rotary actuator assembly 540. The movement of the rotary actuator assembly 540 positions the recording head 529 over the desired data track on the recording media 516.

When energized by control circuitry, which may include, for example, a processor, the voice coil 543 moves and thereby rotates E-block 524 with the rigid arms 522 and the at least one load beam assembly 520 to position the recording head 529 over the data tracks on the recording media 516. As the recording media 516 rotates in the direction of the curved arrow 517 shown in FIG. 1, the movement of the rotary actuator assembly 540 allows the recording head 529 on the slider 528 to access different data tracks on the recording media 516. The process of moving the recording head 529 to the correct track is known as "seeking." When the data storage device 500 is not seeking, reading, or writing, it is in what is referred to herein as the idle state.

The array 32 of electrically conductive interconnect traces or lines connects at one end to the recording head 529 and at its other end to read/write circuitry contained in an electrical module or chip 550, which, in the data storage device 500 of FIG. 1, is secured to a side of the E-block 524. The chip 550 includes a read/write integrated circuit (R/W IC). The chip 550 may include a controller (e.g., as part of the R/W IC or external to it). The chip 550 may assist in the implementation of the techniques described herein.

To read information from the recording media 516, the recording head 529 may include at least one read head or read sensor. The read sensor(s) in the recording head 529 may include, for example, one or more giant magnetoresistance (GMR) sensors, tunneling magnetoresistance (TMR) sensors, or another type of magnetoresistive sensor. When the slider 528 passes over a track on the recording media 516, the recording head 529 (via the read head) detects changes in resistance due to magnetic field variations recorded on the recording media 516, which represent the recorded bits.

To write information to the recording media 516, the recording head 529 includes a write head (or write portion). In general, the write head can be any suitable write head. Some of the examples included herein describe and illustrate a HAMR head, but it is to be appreciated that the disclosed techniques are applicable to other types of recording head 529.

In operation, after the voice coil 543 has positioned the recording head 529 over the data tracks on the recording media 516, the recording head 529 may be used to write information to one or more tracks on the surface of the recording media 516 and to read previously-recorded information from the tracks on the surface of the recording media 516. The tracks may comprise discrete data islands of magnetizable material (e.g., bit-patterned media), or the recording media 516 may have a conventional continuous magnetic recording layer of magnetizable material. Processing circuitry in the data storage device 500 (e.g., on the chip 550) provides to the recording head 529 signals representing information to be written to the recording media 516 and receives from the recording head 529 signals representing information read from the recording media 516.

Higher storage bit densities in magnetic recording media (e.g., the recording media 516) used in data storage devices (e.g., the data storage device 500 shown in FIG. 1) have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media.

One way to address this problem is by using a recording media 516 that has a high coercivity so that room temperatures do not cause erasures. To write to a recording media 516 with such high coercivity, heat can be used to lower the effective coercivity of a localized region on the surface of the recording media 516 and write data within this heated region. The data state becomes "fixed" upon cooling the recording media 516 to ambient temperatures. This technique is broadly referred to as "thermally assisted (magnetic) recording" (TAR or TAMR), "energy assisted magnetic recording" (EAMR), or "heat-assisted magnetic recording" (HAMR). The term "HAMR" is used herein to refer to all of TAR, TAMR, EAMR, and HAMR.

One type of HAMR data storage device 500 uses a laser and an optical waveguide coupled to a near-field transducer (NFT) for heating the recording material on the recording media 516. A "near-field" transducer refers to "near-field optics," wherein light is passed through a first element with subwavelength features and the light is coupled to a second element, such as a substrate (e.g., of a recording media 516), located a subwavelength distance from the first element. The NFT is typically located at the ABS of the slider 528. An NFT may have a generally triangular output end, such that an evanescent wave generated at a surface of the waveguide couples to surface plasmons excited on the surface of the NFT, and a strong optical near-field is generated at the apex of the triangular output end.

During the writing process, the laser, in cooperation with a waveguide and NFT, generates a tiny, focused spot of intense heat on the surface of the recording media 516. This heat temporarily reduces the coercivity (the resistance to changes in magnetic orientation) of the material, allowing the write head to more easily flip the magnetic state of the targeted area using a lower magnetic field than would otherwise be required. After the writing process, the spot cools down rapidly, and the magnetic material solidifies with the new orientation.

Due to the use of heat in HAMR, during write operations, various components in the data storage device 500 (e.g., the NFT itself, cladding material surrounding the NFT, etc.) can experience very high temperatures that can cause chemical reactions among materials in the recording components (e.g., the recording head 529) and/or atmosphere (e.g., the fill gas of a sealed data storage device) of the data storage device 500 and/or the recording media 516. These reactions can generate contaminants in the interior of the data storage device 500, including water vapor/humidity that was absorbed on the surface of the recording media 516. The water vapor can lead to performance degradation, reduced reliability, and/or reduced lifetime operability.

As an example, cladding on and around the HAMR components of the recording head 529 can be eroded during write operations due to water being present on the recording media 516 becoming steam, or water in the gas phase. Therefore, one way to mitigate cladding erosion is by reducing the relative humidity. Lower relative humidity results in less water on the recording media 516 or in the gas phase, which reduces the likelihood of steam causing cladding erosion and thus increases the operational lifetime of the recording head 529.

Another issue with data storage devices 500 that use HAMR is that excessive heating of the NFT can cause performance degradation and eventually failure of the data storage device 500. One possible cause of failure due to excessive heating may be due to adsorption of carbonaceous material on the slider 528 overcoat near the NFT tip. Hydrocarbon molecules from the recording media 516 overcoat and lubricant can become mobile at elevated temperatures and adsorb on the ABS of the slider 528. Over time, these molecules can form a "smear" that absorbs power from the laser source and causes the NFT, which, as explained above, normally operates at very high temperatures, to become even hotter than usual. The heat transfer can result in diffusion of the NFT metal until the NFT tip rounds and recording degrades, eventually possibly leading to failure of the data storage device 500. Smear is common in data storage devices 500.

It is desirable for the fly height of the slider 528 to be stable throughout the lifetime of the data storage device 500. In a data storage device 500 that uses HAMR, smear generated at the NFT (e.g., as described above) can accumulate on the ABS due to extra heat at the head-disk interface. This smear can cause the fly height of the slider 528 to increase over time, which can cause errors. It is thus desirable to find ways to reduce smear and maintain a stable flying height for the slider 528.

For data storage devices 500 that use HAMR, the relative humidity is generally controlled so that it is less than 5%, as taught by U.S. Pat. No. 10,468,071, which issued on Nov. 5, 2019 and is entitled "MAGNETIC STORAGE DEVICE WITH HEAT-ASSISTED MAGNETIC STORAGE HEAD AND ASSOCIATED METHOD OF MANUFACTURE." U.S. Pat. No. 10,468,071 is hereby incorporated by reference in its entirety for all purposes. Desiccant packs can be used during the assembly process to absorb excess moisture, and the data storage device 500 then remains close to the target relative humidity level throughout its lifetime, in part because it is sealed.

As explained above, smear can be generated at the ABS of a HAMR recording head 529, which can cause the fly height of the slider 528 to increase gradually. The accumulation of smear at the ABS is more pronounced in low-humidity conditions. Furthermore, when the relative humidity is low, there can be undesirable interactions between the recording head 529 and the recording media 516, as described further below, which can lead to wear. Thus, the design of a HAMR data storage device 500 should take into account HAMR recording head 529 reliability (which is promoted by low humidity) and tribological performance (which includes consideration of wear propensity and smear accumulation).

Smear can contain materials such as carbon, silicon, and/or nitrogen. Consequently, if the smear is hot enough while in the presence of enough oxygen, it can oxidize and produce glassy products (e.g., materials that have amorphous, non-crystalline structures similar to that of glass, such as, e.g., $SiO_2$, etc.) and/or carbon-based gases (e.g., $CO$, $CO_2$, etc.), or combinations thereof. The produced gases dissipate, and the HAMR head's laser light can typically penetrate the resulting glassy products (if present) without heating them, which allows the recording head 529 to provide the desired heating of the recording media 516 while preventing excessive heating of the NFT, which can substantially improve the lifetime of the NFT and, therefore, the data storage device 500. Therefore, before a data storage device 500 that uses HAMR is placed into service, it may undergo a bring-up process during which the recording head 529 is pre-treated, without writing any data, to deliberately form an optically-transparent smear over the NFT. Techniques for pre-treating the recording head 529 for this purpose are described in U.S. Pat. No. 10,950,266, which issued on Mar. 16, 2021 and is entitled "IN-SITU NFT PRE-TREATMENT TO ACCUMULATED OPTICALLY TRANSPARENT MATERIAL ON NFT TO IMPROVE RELIABILITY." The entirety of U.S. Pat. No. 10,950,266 is hereby incorporated by reference in its entirety for all purposes.

The presence of water during the pre-treatment process during which an optically-transparent smear is created over the NFT is undesirable because it can result in hydrolysis and a failure to form the protective layer. Therefore, it is desirable for the humidity inside of the data storage device 500 to be low during this pre-treatment process.

Because low humidity can significantly increase head lifetime (e.g., by mitigating deleterious effects such as cladding erosion during operation, by promoting formation of an optically-transparent smear during a bring-up process that includes pre-treatment of the recording head 529 at the ABS, etc.), the humidity in the manufacturing environment is typically controlled. In addition, conventional data storage devices sometimes include desiccants or breather filters to reduce the humidity level within the interior of the assembled device. Desiccants and filters are passive mechanisms that can absorb the internal water vapor and mitigate the infiltration of any external water vapor, at least until they are saturated.

Although low humidity is preferable during certain phases of operation of the data storage device 500 (e.g., when the recording head 529 is pre-treated during bring-up, to mitigate unwanted effects such as cladding erosion during operation of the data storage device 500, etc.), there are some operating conditions in which higher humidity would be desirable and/or helpful. For example, from a tribology perspective, having some humidity inside of the data storage device 500 is desirable to reduce friction and wear between the recording head 529 and the surface of the recording media 516. Humidity can be especially helpful when the recording head 529 remains on (over) the same track of the recording media 516 for a relatively long period of time. One example of such a condition is the formatting process that may take place during the manufacturing phase, before the data storage device 500 is placed into service. Another example of such a condition is during an adjacent track interference (ATI) refresh function. In some magnetic disk devices, when data are written to a disk, such data may be erased because of flux leaked from a head or the like. The interference is sometimes referred to as adjacent track interference (ATI) and the erasure as side erase. Different ATIs are caused based on various factors, including head characteristics, track per inch (TPI) setting values, and/or write current setting values. In order to prevent, mitigate, or remediate side erases, a data storage device 500 can include a function to rewrite data of a certain track when the number of writes of data to peripheral tracks of the certain track reaches a predetermined number. This process can be referred to as the ATI refresh operation.

Figure 2A:
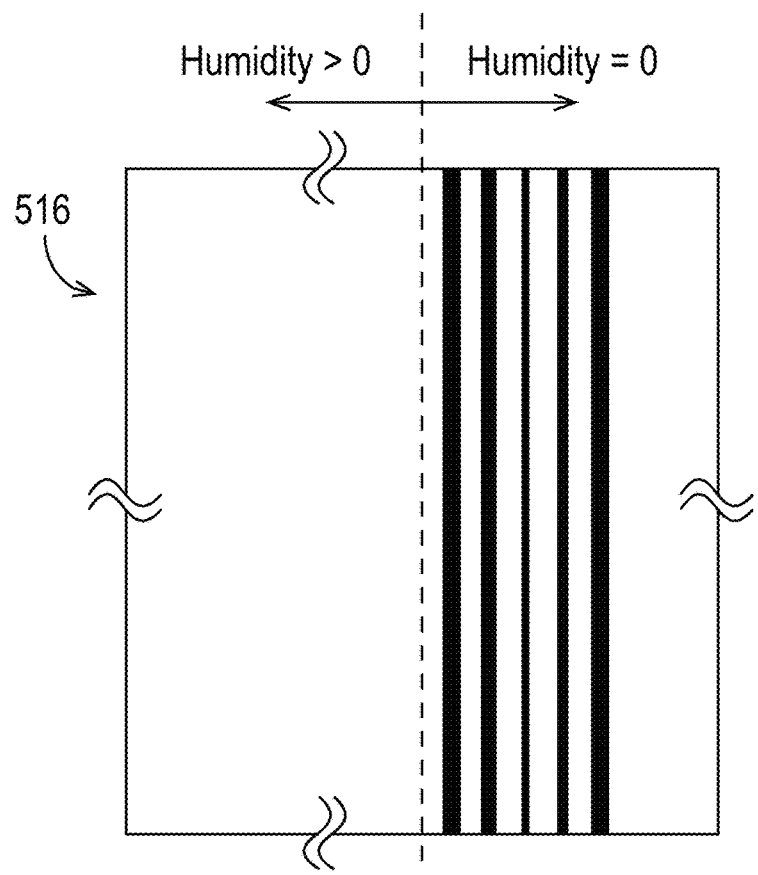
FIG. 2A is a representation of recording media wear due to on-track overwriting.

FIG. 2A is a representation of recording media 516 wear due to on-track overwriting (e.g., as part of an ATI refresh operation or for another reason). The portion of FIG. 2A to the left of the dashed line illustrates recording media 516 wear due to on-track overwriting when the relative humidity is greater than zero percent, and the portion of FIG. 2A to the right of the dashed line illustrates recording media 516 wear due to on-track overwriting when the relative humidity is zero percent. As shown by FIG. 2A, a lack of humidity can result in the slider 528 contacting the surface of the recording media 516 and causing wear or grooves in the recording media 516 surface. These grooves can be, for example, a couple of nanometers deep. This damage to the recording media 516 can lead to failure of the data storage device 500 and/or loss of data. In contrast, with a higher relative humidity, the recording media 516 is undamaged, in part because the interface between the slider 528 and the recording media 516 has more lubrication provided by the moisture, and the slider 528 is less likely to contact or crash into the recording media 516.

Figure 2B:
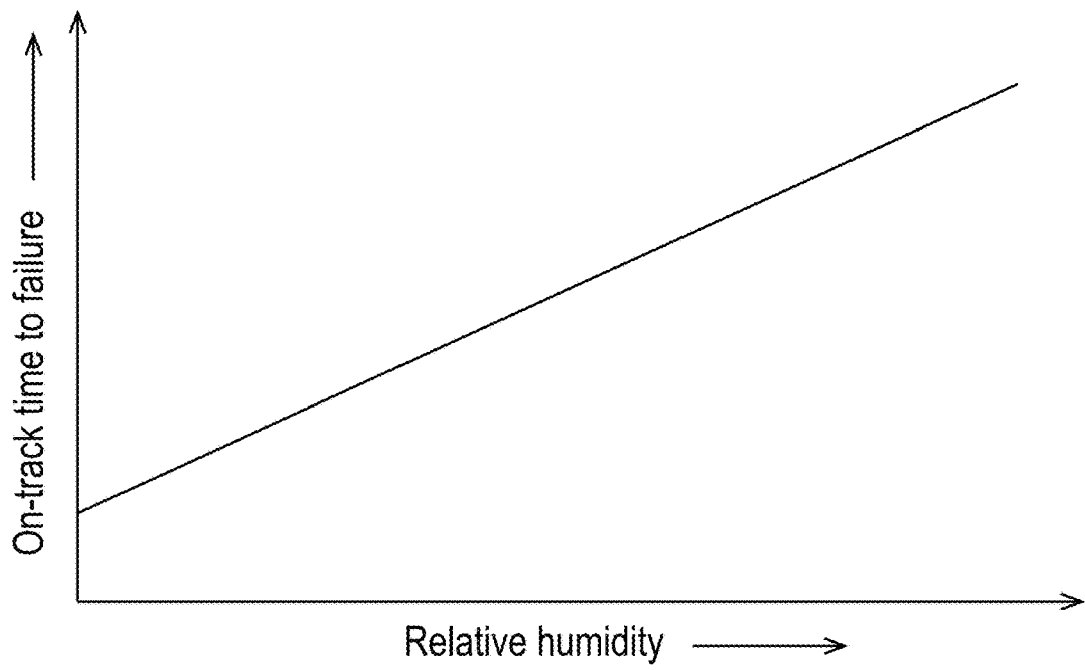
FIG. 2B is a plot illustrating the how the relative humidity can affect the time-to-failure of the data storage device when the slider remains on the same track for an extended period of time.

FIG. 2B is a plot illustrating the how the relative humidity can affect the time-to-failure of the data storage device 500 when the slider 528 remains on the same track for an extended period of time. As shown in FIG. 2B, the general trend is that as the relative humidity increases, so does the expected on-track time-to-failure. In other words, the likelihood of damage to the recording media 516 and/or failure of the data storage device 500 decrease as the relative humidity increases. It is to be appreciated that there may be a relative humidity level (e.g., percentage) above which additional moisture does not further increase the time-to-failure. Modeling and/or experimentation can be used to determine a desirable or optimal relative humidity level for a particular data storage device 500 design and/or slider 528 fly height in order to meet a target time-to-failure. Such modeling and experimentation are well within the level of ordinary skill in the art.

Another circumstance in which higher humidity may be beneficial is to mitigate the effects of carbonaceous smear at the recording head 529 ABS, which can cause the slider 528 fly height to increase as the data storage device 500 operates. The presence of carbonaceous smear can also cause damage to the recording media 516 (e.g., the overcoat). A higher humidity level can reduce the adverse effects of carbonaceous smear pickup.

As the above discussion indicates, it is desirable for the relative humidity to be different at different times (or during different phases or stages) of operation of a data storage device 500. At certain times, such as when the recording head 529 is pretreated and when the data storage device 500 is executing less stressful operations, it is desirable for the relative humidity to be low, but at other times, such as when the recording head 529 remains over the same track for an extended period of time (e.g., during the bring-up process or during ordinary operation), or when the recording head 529 has picked up enough carbonaceous smear that it may damage the overcoat of the recording media 516, it is desirable for the relative humidity to be higher. Therefore, it is suboptimal for the relative humidity to be "fixed" at a particular value during the lifespan of the data storage device 500. Likewise, techniques that only allow the humidity to be reduced are suboptimal.

The inventors named herein had the insight that it would be desirable to be able to adjust the relative humidity inside of the enclosure of a data storage device 500 so that different amounts of water vapor are present at different times. Providing control of the humidity as the data storage device 500 operates would be a significant improvement over simply setting the humidity to a particular target value for the lifetime of the data storage device 500, or passively decreasing the humidity over the lifetime of the data storage device 500 (e.g., using a desiccant).

Accordingly, described herein are techniques for humidity control within electronic devices, such as data storage devices 500. Such data storage devices 500 include, for example, HAMR devices. The disclosed techniques allow the relative humidity to be controlled as the data storage device 500 operates. Various levels of control can be provided. For example, the humidity can be increased momentarily and by a slight amount when the data storage device 500 is engaged in an operation in which additional water vapor would be helpful, or after the data storage device 500 has been in operation for a long enough time that increasing the humidity by a small amount (e.g., up to some percentage, such as 1%, 2%, 3%, etc.) for a small period of time would help to overcome tribology challenges.

As used herein, the term "water-releasing substance" includes both (a) substances that release water in a temperature-sensitive manner (e.g., a substance that, when heated sufficiently, releases water), which are also sometimes referred to herein as "heat-responsive water-releasing substances," and (b) a group of two or more chemicals that, when mixed together, release water. It is to be appreciated that a mixture of chemicals that releases water may be temperature-sensitive (e.g., at different temperatures, the mixture releases different amounts of water or releases water at different rates, or at some temperatures the mixture releases water and at other temperatures it does not, etc.). It is also to be appreciated that a heat-responsive water-releasing substance may comprise a mixture of chemicals or materials. Accordingly, (a) and (b) are not necessarily mutually exclusive categories.

As explained further below, a water-releasing substance is included in the data storage device 500. In some embodiments, the data storage device 500 also includes a control mechanism that, in response to a trigger condition, causes the water-releasing substance to release water. The control mechanism may include a controller that, in response to the trigger condition, controls another component of the data storage device 500 so that the water-releasing substance releases water. For example, the data storage device 500 can include, in addition to a heat-responsive water-releasing substance, a heater and a controller physically and/or communicatively coupled to the heater. The heat-responsive water-releasing substance can be situated near the heater so that it can be selectively subjected to heat generated by the heater under the control of the controller. As another example, when the water-releasing substance is a group of two or more chemicals that, when mixed together, release water, the controller may control a mixing apparatus that mixes the chemicals together (e.g., at a controllable rate, in controllable quantities, etc.) to cause water to be released in particular amounts or at a particular rate.

By providing active humidity control, the humidity inside of a data storage device 500 can be increased when desirable. Thus, using the techniques described herein, the relative humidity inside of the data storage device 500 can be kept at a low level during some or all of a bring-up process performed during the manufacturing process (e.g., to allow pre-treatment of the recording head 529 to form the protective optically-transparent smear at the ABS), then increased for one or more other portions of the bring-up process (e.g., a formatting process). The relative humidity can be kept low when desirable during operation in the field, but increased as desired as the data storage device 500 operates to alleviate tribology challenges that might otherwise arise at low levels of relative humidity (e.g., during more intensive writing operations, during on-track dwelling, during ATI refresh operations, etc.). For example, the humidity can be increased after some amount of time the data storage device 500 has been in operation or writing (e.g., 50 hours, 100 hours, etc.), which can mitigate the effects of carbonaceous smear and increased slider 528 fly height.

The relative humidity can be controlled based on any suitable trigger condition (or conditions). Suitable trigger conditions may include, for example, a measurement or estimate of the relative humidity indicating that the humidity is too high or too low; passage of an amount of time (e.g., an amount of time the NFT laser has been in operation, an amount of time the data storage device 500 has been in operation, etc.); the occurrence of repeated on-track dwelling; detection or occurrence of a command (e.g., a formatting command, an ATI refresh command, etc.); or any other suitable condition that indicates a change in the relative humidity would be desirable.

To reduce the relative humidity after it has been deliberately increased (e.g., during an ATI refresh operation, etc.), a water-absorbing material (e.g., a desiccant, a filter, etc.) or water-consuming materials (e.g., metal peroxides, $Ca_2O$, $MgO_2$, $Na_2O_2$, oxides such as CaO, etc.) can additionally be provided. The water-absorbing material can be a passive mechanism (e.g., a substance that absorbs water as a matter of course, absent a control mechanism) or an active mechanism (e.g., a substance that can react with water). Thus, the disclosed techniques can be used to adjust the relative humidity as the data storage device 500 operates, thereby allowing a more optimal environment to be provided (e.g., by matching the relative humidity to the operational phase or activity of the data storage device 500).

Figure 3:
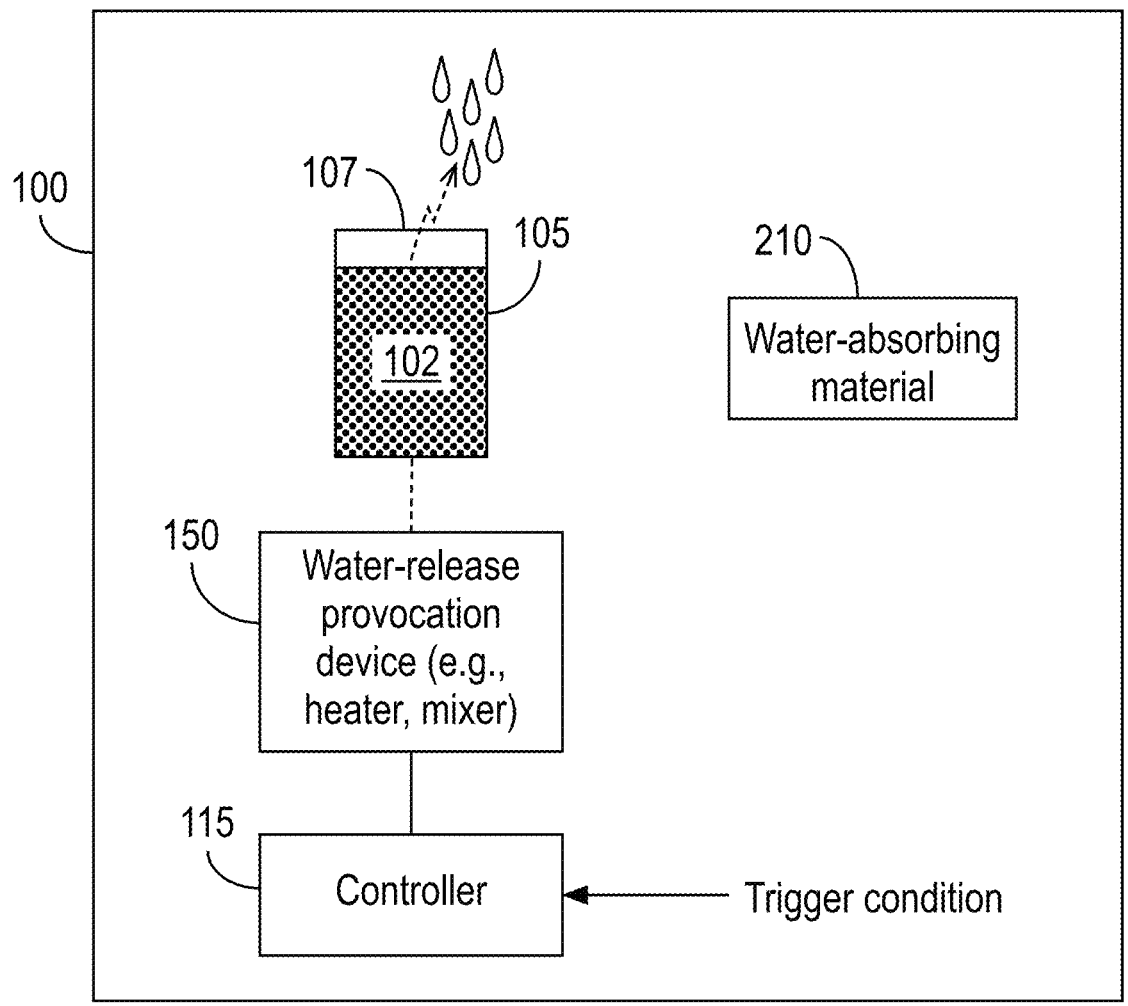
FIG. 3 is an illustration of components of an active humidity adjustment system in accordance with some embodiments.

FIG. 3 is an illustration of components of an active humidity adjustment system 100 in accordance with some embodiments. The active humidity adjustment system 100 includes a container 105, a water-release provocation device 150, a controller 115, and a water-absorbing material 210.

The container 105 contains a water-releasing substance 102. The water-releasing substance 102 can be, or can comprise, a heat-responsive water-releasing substance and/or a group of two or more chemicals that, when mixed together, release water. Suitable water-releasing substance 102 candidates are described in further detail below in the context of FIGS. 5-8.

The water-releasing substance 102 can be a single substance or a mixture of chemicals and/or substances, which can allow the characteristics of the water-releasing substance 102 to be adjusted and/or tuned. For example, when the water-releasing substance 102 comprises a moisture-releasing chemical (such as, for example, sodium percarbonate ($Na_2CO_3 \cdot 1.5H_2O_2$), carbamide peroxide ($CH_6N_2O_3$, which can be written more specifically as ($NH_2)_2CO_3 \cdot H_2O_2$), or sodium perborate tetrahydrate ($NaBO_3 \cdot 4H_2O$), a superabsorbent polymer, etc.), the water-releasing speed of the water-releasing substance 102 can be adjusted by mixing two or more water-releasing chemical(s) and/or mixing the water-releasing chemical(s) with one or more water-absorbing chemicals (e.g., $CaO_2$, $MgO_2$, $Na_2O_2$, etc.). The water-releasing isotherm can also be adjusted by pre-conditioning the water-releasing substance 102 (e.g., mixing it with other chemicals).

The water-release provocation device 150 can be a device that causes the water-releasing substance 102 to release water. For example, as discussed further below, in the case that the water-releasing substance 102 is a heat-responsive water-releasing substance, the water-release provocation device 150 can be or comprise a heater. As also discussed further below, in the case that the water-releasing substance 102 is a group of two or more chemicals that, when mixed together, release water, the water-release provocation device 150 can be or comprise a mixing device. The water-release provocation device 150 can be a combination of devices (e.g., a heater and a mixer). It will be appreciated that an appropriate water-release provocation device 150 can be selected based on the selected water-releasing substance 102.

The vertical dashed line between the water-release provocation device 150 and the container 105 in FIG. 3 indicates that the water-release provocation device 150 may be in contact with (e.g., physically connected to) the container 105, or the water-release provocation device 150 may merely be in the vicinity of the container 105 such that the water-release provocation device 150 can act on the water-releasing substance 102 to cause it to release water.

The container 105 has a membrane 107 through which water molecules released by the water-releasing substance 102 can exit the container 105. The membrane 107 is configured to prevent the water-releasing substance 102 itself from leaving the container 105. In other words, the membrane 107 is permeable to released water molecules but impermeable to the water-releasing substance 102 itself. The membrane 107 can be made from a material that allows water molecules to be released at a desired rate. The materials used for the membrane 107 can be a design parameter for the active humidity adjustment system 100.

The controller 115 is physically and/or communicatively coupled to the water-release provocation device 150. The controller 115 can detect or receive a trigger condition that prompts the controller 115 to control the water-release provocation device 150 such that the water-release provocation device 150 causes the water-releasing substance 102 to release water.

As will be appreciated, a controller 115 is a component, device, or subsystem that is responsible for managing and/or regulating the operation of an electric circuit and/or the devices connected to it. A controller 115 can monitor inputs, process information, and generate outputs to ensure that a circuit or system operates as intended. A controller 115 can be used to automate processes, maintain desired conditions, and/or provide control over various aspects of a system's behavior. It will be appreciated that a controller 115 can take various forms, ranging from simple analog devices, state machines, counters, etc. to sophisticated digital microcontrollers, programmable logic controllers (PLCs), etc. The controller 115 illustrated herein can take any suitable form. For example, the controller 115 can be a microcontroller (e.g., an integrated circuit that contains a processing unit (CPU), memory, and input/output ports) that can be programmed to perform the tasks described herein as being performed by a controller 115. As another example, the controller 115 can be a state machine implemented via suitable hardware (e.g., flip flops, gates, etc.). As another example, the controller 115 can be a PLC (e.g., a specialized digital computer that can monitor inputs, make decisions based on programmed logic, and control outputs to automate various processes). As another example, the controller 115 can be a digital signal processor (DSP) programmed to carry out the tasks described herein as being performed by the controller 115. The controller 115 can be included in or implemented by the chip 550 described above in the discussion of FIG. 1.

In the active humidity adjustment system 100, the controller 115 is responsible for controlling the water-release provocation device 150. The controller 115 may monitor for or be informed about a trigger condition and then instruct the water-release provocation device 150 to act on the water-releasing substance 102 in order to cause the water-releasing substance 102 to release water when it is desirable for the humidity to be increased.

The trigger condition can be any suitable condition. As an example, the controller 115 can monitor the humidity within the enclosure of the data storage device 500 and, when the humidity is too low, control the water-release provocation device 150 to increase the relative humidity. As another example, the controller 115 can monitor the operation of the data storage device 500 and cause the water-release provocation device 150 to act on the water-releasing substance 102 in response to detecting a trigger condition. As a specific example, the controller 115 can identify when the data storage device 500 is performing an operation in which it is expected or known that higher relative humidity would be helpful (e.g., during more intensive writing operations, during on-track dwelling, during ATI refresh operations, etc.). The controller 115 can, for example, be aware of commands and/or instructions sent to the recording head 529 (e.g., by monitoring a communication channel) and control the water-release provocation device 150 in response to the content or occurrence of those commands and/or instructions.

As another example, another component (e.g., a processor) of the data storage device 500 (e.g., on the chip 550) can inform the controller 115 that additional humidity is warranted or desirable (e.g., by writing a value to a register that the controller 115 reads), and the controller 115 can detect the command to increase the humidity (e.g., by reading the register). In this way, the processor can instruct the controller 115 to increase the relative humidity, and the controller 115 can detect the instruction and control the water-release provocation device 150 to increase the humidity. Thus, the controller 115 can actively monitor for the trigger condition (e.g., by monitoring measurements from a humidity sensor, by observing communications associated with the recording head 529, etc.), or the trigger condition can be an instruction given to the controller 115 (e.g., directly via an input port, via a register read by the controller 115, etc.).

In some embodiments, the controller 115 is implemented by a processing device (e.g., on the chip 550) that also performs other tasks of the data storage device 500. Thus, it is not a requirement that the controller 115 be a dedicated, separate device provided as part of the active humidity adjustment system 100. It is to be appreciated that although FIG. 3 illustrates the water-release provocation device 150 and controller 115 as separate components, the controller 115 and the water-release provocation device 150 can be integrated together (e.g., part of the same component).

The water-absorbing material 210 is provided to absorb water, which allows the data storage device 500 to return to a drier condition after the relative humidity has been increased by water emitted by the water-releasing substance 102 in the container 105. The water-absorbing material 210 can be, for example, a desiccant, calcium peroxide ($CaO_2$), magnesium peroxide ($MgO_2$), sodium peroxide ($Na_2O_2$), or a hydrogel. As will be appreciated by those having ordinary skill in the art, desiccants are substances that absorb moisture. Desiccants include silica gel, calcium chloride ($CaCl_2$), a molecular sieve, activated charcoal, montmorillonite clay (also known as bentonite), Drierite (a type of anhydrous calcium sulfate), a zeolite (a microporous aluminosilicate mineral with a high affinity for water), and others. By adjusting the amount and type of the water-releasing substance 102 and the water-absorbing material 210, and the temperature (e.g., for a heat-responsive water-releasing substance) or mixing (e.g., for a group of two or more chemicals), the humidity of the data storage device 500 can be adjusted.

As will also be appreciated by those having ordinary skill in the art, calcium peroxide is a chemical compound that has the ability to release oxygen when it reacts with water or acids. Other disclosures by the inventors named herein, including U.S. patent application Ser. No. 18/492,559, filed Oct. 23, 2023 and entitled "DEVICES AND METHODS FOR METAL ORGANIC FRAMEWORK (MOF) BASED OXYGEN REPLENISHMENT IN DATA STORAGE DEVICES" and U.S. patent application Ser. No. 18/581,343, filed Feb. 19, 2024 and entitled "PASSIVE AND ACTIVE GAS COMPENSATION TECHNIQUES FOR DATA STORAGE DEVICES", both of which are hereby incorporated by reference in their entireties for all purposes, describe how oxygen can be consumed by data storage devices 500 as they operate. The use of calcium peroxide as the water-absorbing material 210 may be desirable due to its ability to release oxygen when it reacts with water.

As will also be appreciated by those having ordinary skill in the art, a hydrogel is a type of gel that has a network of crosslinked polymer chains that has a semi-solid, jelly-like structure and can absorb and retain a significant amount of water. Hydrogels can be composed of synthetic or natural polymers and have the ability to hold large amounts of water while maintaining their structural integrity.

The water-absorbing material 210 can be placed in the interior of the data storage device 500 in any suitable manner, such as in a canister, a packet, or in a compartment or tray designed to hold the water-absorbing material 210.

As explained above, the water-release provocation device 150 is coupled to and/or situated near the container 105. The water-release provocation device 150 and container 105 are situated inside of the data storage device 500 such that the water-release provocation device 150 can affect the water-releasing substance 102 in a manner that causes the water-releasing substance 102 to release water and thereby increase the relative humidity.

Figure 4A:
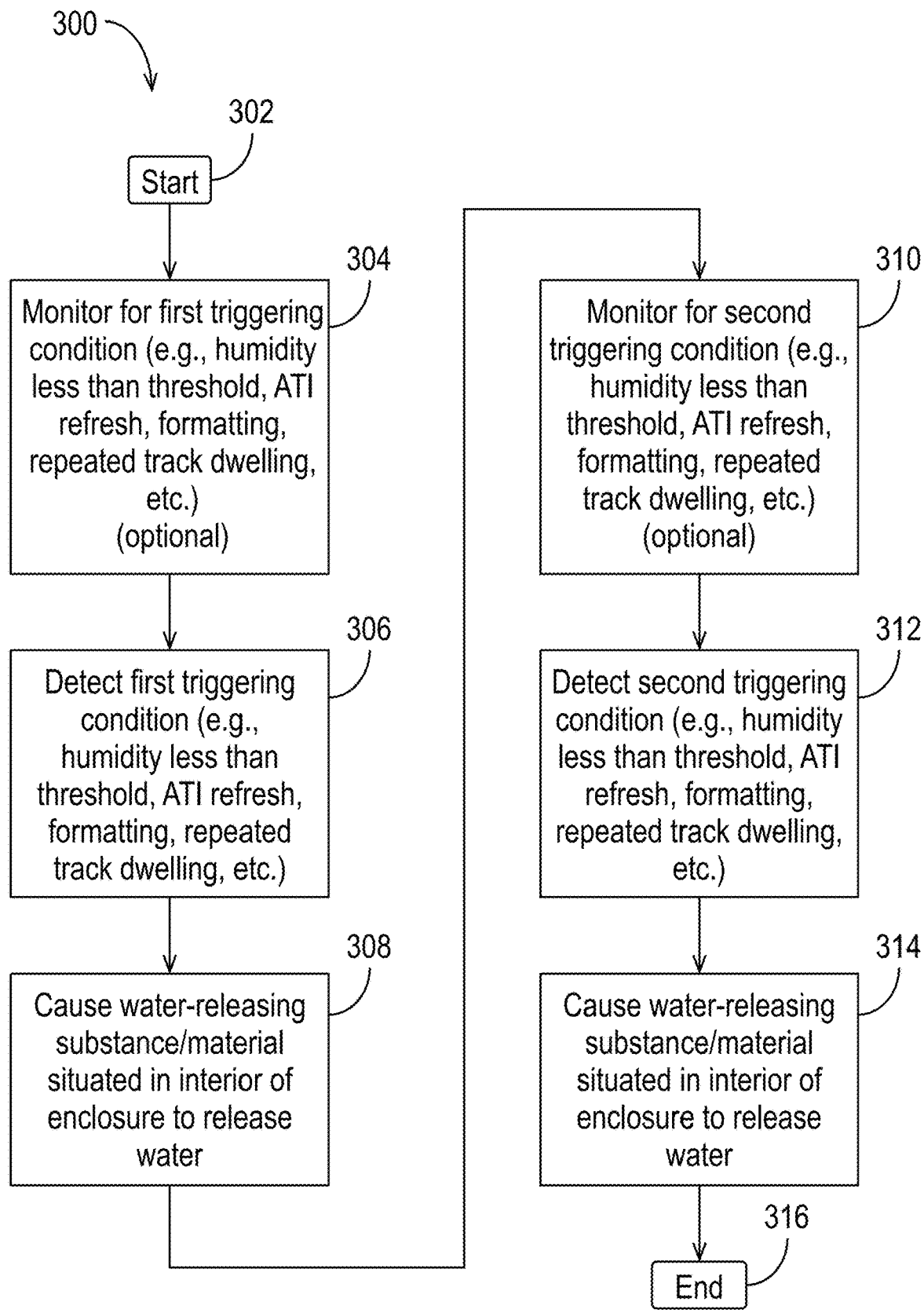
FIG. 4A is a flow diagram illustrating a method of multi-stage humidity control in accordance with some embodiments.

FIG. 4A is a flow diagram illustrating a method 300 of multi-stage humidity control in accordance with some embodiments. At block 302, the method 300 begins. At block 304, optionally, a component of the data storage device 500 (e.g., a processor, the controller 115, etc.) monitors for a first trigger condition. The first trigger condition could be any condition that suggests an increase in the relative humidity would be desirable. For example, the first trigger condition can be that the data storage device 500 has been in service for more than a threshold amount of time, or the total operation time of the laser of the HAMR head has reached a threshold amount of time (e.g., 50 hours). As another example, the first trigger condition can be that the relative humidity is less than a threshold. As a specific example, in embodiments that include a sensor 170, as described below, the controller 115 can monitor the relative humidity measurements of the sensor 170 so as to be able to determine when the humidity is too low. As another example, the first trigger condition can be that an ATI refresh command has been issued. In this case, the controller 115 can monitor a communication path to detect the issuance of the ATI refresh command, read a register, or receive an input signal notifying the controller 115 that an ATI refresh command has been issued. As yet another example, the first trigger condition can be that the recording head 529 has remained or will remain over a particular track for a specified amount of time (e.g., measured in units of time, revolutions of the recording media 516, clock cycles, etc.).

The first trigger condition can be more complicated than these examples. For example, the first trigger condition can be that the data storage device 500 has been in service (or the laser of the HAMR head has been operating) for more than a threshold amount of time, and an ATI refresh command has been issued. In general, the first trigger condition can be any condition or combination of conditions that indicate the relative humidity should be increased.

At block 306, the first trigger condition is detected. For example, the controller 115 can detect, at block 306, that the data storage device 500 has been in service for more than a threshold amount of time, or the total operation time of the laser of the HAMR head has reached a threshold amount of time (e.g., 50 hours). As another example, the controller 115 can detect, at block 306, that the relative humidity is less than a threshold. As another example, the controller 115 can detect, at block 306, that a command (e.g., an ATI refresh command) has been issued. As yet another example, the controller 115 can detect, at block 306, that the recording head 529 has remained or will remain over a particular track for a specified amount of time. As another example, the controller 115 can receive a command or instruction from another component of the data storage device 500 (e.g., the chip 550) to increase the relative humidity.

As explained above, the first trigger condition can be more complicated than these examples. For example, the controller 115 can detect, at block 306, that the data storage device 500 has been in service (or the laser of the HAMR head has been operating) for more than a threshold amount of time, and a particular command (e.g., an ATI refresh command) has been issued.

At block 308, the water-releasing substance 102 is acted on by the water-release provocation device 150. For example, as explained further below, in the case that the water-releasing substance 102 is a heat-responsive water-releasing substance, the water-release provocation device 150 can be or comprise a heater. As another example, as explained further below, in the case that the water-releasing substance 102 is a group of two or more chemicals that, when mixed, produce water, the water-release provocation device 150 can be or comprise a mixing device. At block 308, the controller 115 turns on and/or controls the heater to heat the water-releasing substance 102 and cause it to release water. As another example, and as also explained further below, in the case that the water-releasing substance 102 is a group of two or more chemicals that, when mixed together, release water, the water-release provocation device 150 can be or comprise a mixing device. At block 308, the controller 115 instructs the mixing device to mix the two or more chemicals together to cause the mixture to release water.

At block 310, optionally, a component of the data storage device 500 (e.g., a processor, the controller 115, etc.) monitors for a second trigger condition. The second trigger condition could be any condition that suggests an increase in the relative humidity would be desirable, such as any of the conditions described above for the first trigger condition. The second trigger condition can be any condition or combination of conditions that indicate the relative humidity should be increased.

At block 312, the second trigger condition is detected. For example, the controller 115 can detect, at block 312, that the data storage device 500 has been in service for more than a threshold amount of time, or the total operation time of the laser of the HAMR head has reached a threshold amount of time (e.g., 50 hours). As another example, the controller 115 can detect, at block 312, that the relative humidity is less than a threshold. As another example, the controller 115 can detect, at block 312, that an ATI refresh command has been issued. As yet another example, the controller 115 can detect, at block 312, that the recording head 529 has remained or will remain over a particular track for a specified amount of time. As another example, the controller 115 can detect, at block 312, that the data storage device 500 has been in service (or the laser of the HAMR head has been operating) for more than a threshold amount of time, and a specified command (e.g., an ATI refresh command) has been issued. As another example, the controller 115 can receive a command or instruction from another component of the data storage device 500 (e.g., the chip 550) to increase the relative humidity.

At block 314, the water-releasing substance 102 is acted on by the water-release provocation device 150. As explained above and further below, in the case that the water-releasing substance 102 is a heat-responsive water-releasing substance, the water-release provocation device 150 can be or comprise a heater that the controller 115 turns on and/or controls to heat the water-releasing substance 102 at block 314 and cause it to release water. As also explained above and further below, in the case that the water-releasing substance 102 is a group of two or more chemicals that, when mixed together, release water, the water-release provocation device 150 can be or comprise a mixing device that the controller 115 controls at block 314 to cause the two or more chemicals to be mixed together to release water.

At block 316, the method 300 ends.

As a specific example of how the method 300 can provide multi-stage humidity control, assume that the first trigger condition is that the data storage device 500 has been in service (or the laser of the HAMR head has been operating) for more than a threshold amount of time, such as a particular number of hours, and the second trigger condition is that the recording head 529 will remain over a single track for a long enough time that additional humidity would be helpful. Detection of the first trigger condition at block 306 would result in the water-releasing substance 102 being acted on by the water-release provocation device 150 (controlled by the controller 115) in block 308, thereby increasing the relative humidity. Detection of the second trigger condition at block 312 would result in the water-releasing substance 102 being acted on by the water-release provocation device 150 (controlled by the controller 115) in block 314.

It is to be appreciated that the controller 115 can take into account the passage of time when performing the method 300. For example, when executing block 314, the controller 115 can take into account the amount of time that has elapsed since block 308 was performed. For example, if block 312 occurs soon after block 308, the controller 115 could, at block 314, cause the water-release provocation device 150 to act on the water-releasing substance 102 differently (e.g., for less time, at a lower temperature, mixing less of the chemicals, etc.) than it would have if more time had passed between block 308 and block 312.

Figure 4B:
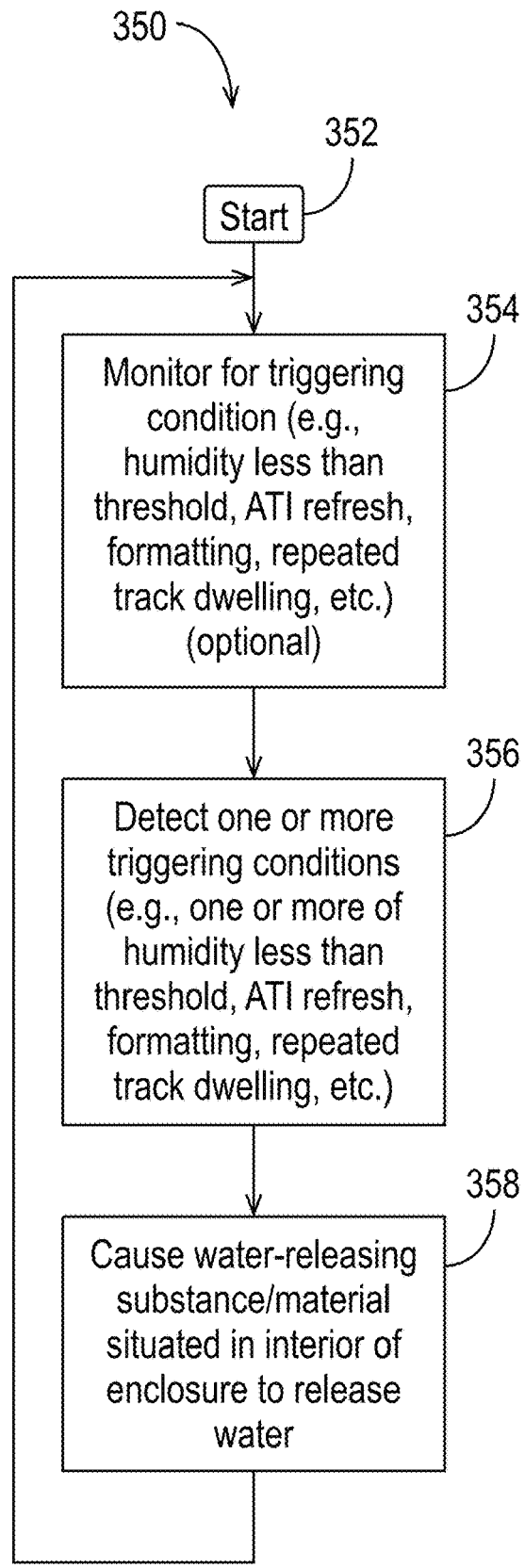
FIG. 4B is a flow diagram of an example of a method that can be performed during the lifetime of the data storage device in accordance with some embodiments.

It is to be appreciated that FIG. 4A can be generalized so that the multi-stage humidity control method has an arbitrary number of stages. FIG. 4B is a flow diagram of an example of a method 350 that can be performed during the lifetime of the data storage device 500 in accordance with some embodiments. At block 352, the method 350 begins. At block 354, optionally, a component of the data storage device 500 (e.g., a processor, the controller 115, etc.) monitors for a trigger condition, where the trigger condition is any of single condition or combination of conditions that suggest an increase in the relative humidity would be desirable. For example, the trigger condition can include one or more of: the data storage device 500 has been in service for more than a threshold amount of time; the total operation time of the laser of the HAMR head has reached a threshold amount of time; the relative humidity is less than a threshold; an ATI refresh command has been issued; a formatting process is occurring or will occur; the recording head 529 has remained or will remain over a particular track for a specified amount of time; or a combination of two or more of these conditions. In general, any condition or combination of conditions that indicate the relative humidity should be increased can be a trigger condition monitored for in block 354.

At block 356, a trigger condition is detected. For example, the controller 115 can detect, at block 356, one or more of the trigger conditions described above for block 354. As another example, the controller 115 can receive, at block 356, a command or instruction from another component of the data storage device 500 (e.g., the chip 550), where the command or instruction directs the controller 115 to increase the relative humidity.

At block 358, the controller 115 controls the water-release provocation device 150 to cause the water-releasing substance 102 to release water. For example, as explained above and further below, in the case that the water-releasing substance 102 is a heat-responsive water-releasing substance, the water-release provocation device 150 can be or comprise a heater that the controller 115 turns on and/or controls to heat the water-releasing substance 102 at block 358 and cause it to release water. As also explained above and further below, in the case that the water-releasing substance 102 is a group of two or more chemicals that, when mixed together, release water, the water-release provocation device 150 can be or comprise a mixing device that the controller 115 controls at block 358 to cause the two or more chemicals to be mixed together to release water.

After the water-release provocation device 150 has acted on the water-releasing substance 102 sufficiently to cause the desired increase in humidity, the method 350 reverts to block 354.

Heat-Responsive Water-Releasing Substances

As stated above, in some embodiments, the active humidity adjustment system 100, method 300, and/or method 350 uses a heat-responsive water-releasing substance that releases water in response to being heated. The heat-responsive water-releasing substance can comprise, for example, a heat-responsive water-releasing salt, such as $Na_2CO_3 \cdot H_2O_2$, $CuSO_4 \cdot xH_2O$, $NaB_4O_7 \cdot xH_2O$, etc.

The heat-responsive water-releasing substance is included in the data storage device at the time of manufacture. As the data storage device operates, a heater inside of the data storage device is selectively controlled (e.g., turned on, adjusted, etc.) to cause the heat-responsive water-releasing substance to release water substantially on demand, thereby providing a way to adjust the relative humidity inside of the data storage device. The heater can be specifically provided for humidity control, or an existing component of the data storage device (e.g., a voice coil motor winding) can be used to selectively heat the heat-responsive water-releasing substance and cause it to release water.

Figure 5:
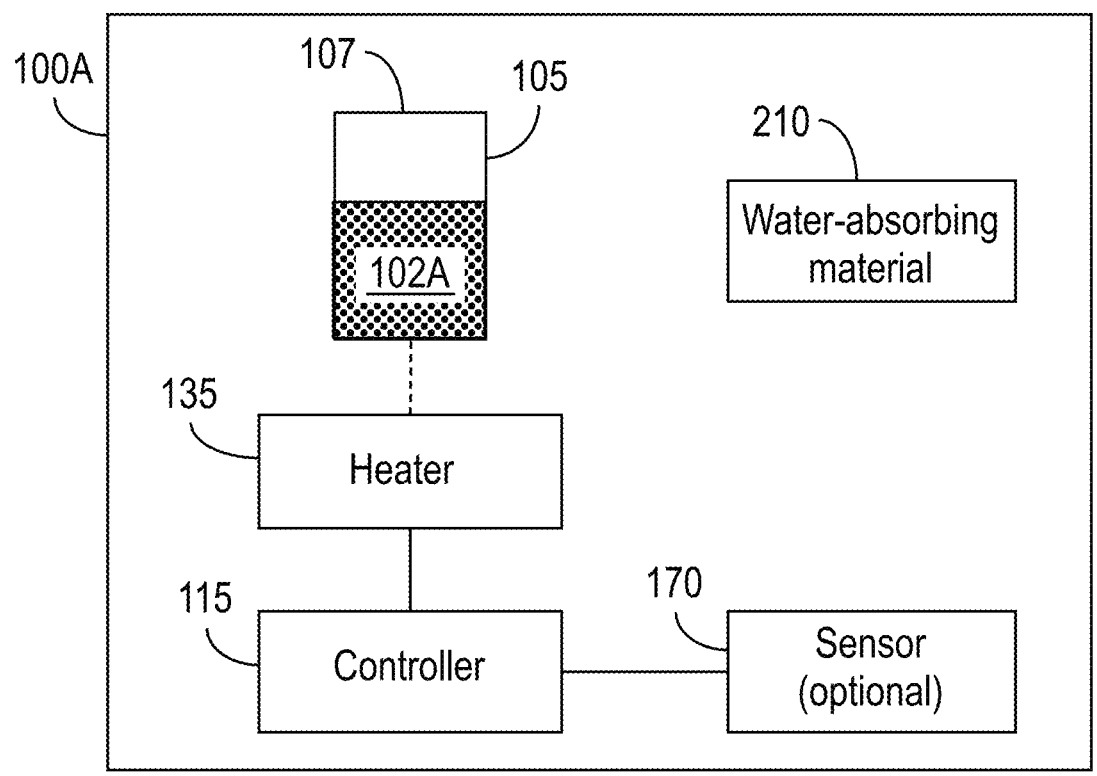
FIG. 5 is a diagram showing components of an active humidity adjustment system that uses a heat-responsive water-releasing substance in accordance with some embodiments.

FIG. 5 is a diagram showing components of an active humidity adjustment system 100A that uses a heat-responsive water-releasing substance 102A in accordance with some embodiments. The active humidity adjustment system 100A includes a container 105, a heater 135, a controller 115, a water-absorbing material 210, and, optionally, a sensor 170. Comparing FIG. 5 to FIG. 3, the water-releasing substance 102 is the heat-responsive water-releasing substance 102A, the water-release provocation device 150 is the heater 135, and the trigger condition can be provided by the sensor 170 (if present).

The controller 115 is physically and/or communicatively coupled to the heater 135 and, if present, the sensor 170. The heater 135 is situated so that the heat it produces acts on the heat-responsive water-releasing substance 102A, which is situated inside of the container 105. The vertical dashed line between the heater 135 and the container 105 in FIG. 5 indicates that heater 135 may be in contact with (e.g., physically connected to) the container 105, or it may merely be in the vicinity of the container 105 such that heat produced by the heater 135 acts on the contents of the container 105 (the heat-responsive water-releasing substance 102A).

The container 105 contains a heat-responsive water-releasing substance 102A and has a membrane 107 through which water molecules released by the heat-responsive water-releasing substance 102A can exit the container 105. The membrane 107 is configured to prevent the heat-responsive water-releasing substance 102A itself from leaving the container 105. In other words, the membrane 107 is permeable to released water molecules but impermeable to the heat-responsive water-releasing substance 102A itself.

The heat-responsive water-releasing substance 102A can comprise any substance that has the ability to release water when exposed to heat. As an example, the heat-responsive water-releasing substance 102A can comprise a hydrate, such as an inorganic hydrate. As will be appreciated by those having ordinary skill in the art, inorganic hydrates are compounds that contain water molecules as part of their crystalline structure. Inorganic hydrates typically have a specific ratio of water molecules to the other components of the compound. The water is bound in a definite manner within the crystal lattice. Inorganic hydrates have a tendency to lose their water of crystallization when heated (efflorescence). Examples of inorganic hydrates include: copper(II) sulfate pentahydrate ($CuSO_4 \cdot 5H_2O$), $CuSO_4 \cdot 3H_2O$, calcium chloride hexahydrate ($CaCl_2 \cdot 6H_2O$), sodium tetraborate decahydrate ($Na_2B_4O_7 \cdot 10H_2O$), magnesium sulfate heptahydrate ($MgSO_4 \cdot 7H_2O$), sodium carbonate decahydrate ($Na_2CO_3 \cdot 10H_2O$), zinc sulfate heptahydrate ($ZnSO_4 \cdot 7H_2O$), cobalt(II) chloride hexahydrate ($CoCl_2 \cdot 6H_2O$), gypsum ($CaSO_4 \cdot 2H_2O$), and alum ($KAl(SO_4)_2 \cdot 12H_2O$). As a specific example, copper(II) sulfate pentahydrate ($CuSO_4 \cdot 5H_2O$) releases four water molecules at temperatures of about 110 degrees Celsius and all five water molecules at temperatures of about 150 degrees Celsius. Sodium tetraborate decahydrate ($Na_2B_4O_7 \cdot 10H_2O$) releases water starting at about 75 degrees Celsius. Cobalt(II) chloride hexahydrate ($CoCl_2 \cdot 6H_2O$) releases all six water molecules at 110 degrees Celsius. Magnesium sulfate heptahydrate ($MgSO_4 \cdot 7H_2O$) releases crystal water at temperatures above about 70 degrees Celsius.

As another example, the heat-responsive water-releasing substance 102A can comprise a hydrate of metal sulfate, such as one or more of: $MgSO_4(H_2O)$, $MgSO_4(H_2O)_4$, $MgSO_4(H_2O)_6$, $MgSO_4(H_2O)_7$, $TiOSO_4(H_2O)$, $VSO_4(H_2O)_6$, $VOSO_4(H_2O)_5$, $Cr(SO_4)(H_2O)_3$, $Cr(SO_4)(H_2O)_5$, $Cr_2(SO_4)_3(H_2O)_{18}$, $MnSO_4(H_2O)$, $MnSO_4(H_2O)_4$, $MnSO_4(H_2O)_5$, $MnSO_4(H_2O)_6$, $MnSO_4(H_2O)_7$, $FeSO_4(H_2O)$, $FeSO_4(H_2O)_7$, $FeSO_4(H_2O)_4$, $Fe^{II}(Fe^{III})_2(SO_4)_4(H_2O)_{14}$, $CoSO_4(H_2O)$, $CoSO_4(H_2O)_6$, $CoSO_4(H_2O)_7$, $NiSO_4(H_2O)$, $NiSO_4(H_2O)_6$, $NiSO_4(H_2O)_7$, $(NH_4)_2[Pt_2(SO_4)_4(H_2O)_2]$, $CuSO_4(H_2O)_5$, $CuSO_4(H_2O)_7$, $ZnSO_4(H_2O)$, $ZnSO_4(H_2O)_4$, $ZnSO_4(H_2O)_6$, $ZnSO_4(H_2O)_7$, $CdSO_4(H_2O)$.

As another example, the heat-responsive water-releasing substance 102A can comprise a hydrate of metal nitrate, such as one or more of: $Cr(NO_3)_3(H_2O)_9$, $Mn(NO_3)_2(H_2O)_4$, $Mn(NO_3)_2(H_2O)$, $Mn(NO_3)_2(H_2O)_6$, $Fe(NO_3)_3(H_2O)_9$, $Fe(NO_3)_3)(H_2O)_4$, $Fe(NO_3)_3(H_2O)_5$, $Fe(NO_3)_3(H_2O)_6$, $Co(NO_3)_2(H_2O)_2$, $Co(NO_3)_2(H_2O)_4$, $Co(NO_3)_2(H_2O)_6$, $\alpha$-$Ni(NO_3)_2(H_2O)_4$, $\beta$-$Ni(NO_3)_2(H_2O)_4$, $Pd(NO_3)_2(H_2O)_2$, $Cu(NO_3)_2(H_2O)$, $Cu(NO_3)_2(H_2O)_{1.5}$, $Cu(NO_3)_2(H_2O)_{2.5}$, $Cu(NO_3)_2(H_2O)_3$, $Cu(NO_3)_2(H_2O)_6$, $Zn(NO_3)_2(H_2O)_4$, $Hg_2(NO_3)_2(H_2O)_2$.

As another example, the heat-responsive water-releasing substance 102A can comprise an inorganic halide with crystallization water, such as one or more of: $CaCl_2(H_2O)_6$, $TiCl_3(H_2O)_6$, $ZrF_4(H_2O)_3$, $HfF_4(H_2O)_3$, $VCl_3(H_2O)_6$, $VBr_3(H_2O)_6$, $VI_3(H_2O)_6$, $Nb_6Cl_{14}(H_2O)_5$, $CrCl_3(H_2O)_6$, $CrCl_2(H_2O)_4$, $CrCl_3(H_2O)_6$, $AlCl_3(H_2O)_6$, $MnCl_2(H_2O)_6$, $MnCl_2(H_2O)_4$, $MnBr_2(H_2O)_4$, $MnI_2(H_2O)_4$, $MnCl_2(H_2O)_2$, $MnBr_2(H_2O)_2$, $FeCl_2(H_2O)_6$, $FeCl_2(H_2O)_4$, $FeBr_2(H_2O)_4$, $FeCl_2(H_2O)_2$, $FeCl_3(H_2O)_6$, $FeCl_3(H_2O)_{2.5}$, $CoCl_2(H_2O)_6$, $CoBr_2(H_2O)_6$, $CoI_2(H_2O)_6$, $CoBr_2(H_2O)_4$, $CoCl_2(H_2O)_4$, $CoCl_2(H_2O)_2$, $CoBr_2(H_2O)_2$, $NiCl_2(H_2O)_6$, $NiCl_2(H_2O)_4$, $NiBr_2(H_2O)_6$, $NiI_2(H_2O)_6$, $NiCl_2(H_2O)_2$, $[Pt(H_2O)_2Cl_4](H_2O)_3$,

[Pt(H$_2$O)$_3$Cl$_3$]Cl(H$_2$O)$_{0.5}$, CuCl$_2$(H$_2$O)$_2$, CuBr$_2$(H$_2$O)$_4$, ZnCl$_2$(H$_2$O)$_{1.33}$, ZnCl$_2$(H$_2$O)$_{2.5}$, ZnCl$_2$(H$_2$O)$_3$, ZnCl$_2$(H$_2$O)$_{4.5}$.

As another example, the heat-responsive water-releasing substance 102A can comprise an organic hydrate such as crystalline salts of cationic multimetallic transition metal complexes, [{(2,6-bis(N,N-bis(2-pyridylmethyl)aminomethyl)-4-tert-butylphenolato)Co$_2$(O$_2$)}$_2$(1,4-benzenedicarboxylato)](NO$_3$)$_4$·xH$_2$O, or a gas hydrate such as methane clathrate (CH$_4$·5.75H$_2$O) or (8CH$_4$·46H$_2$O). As will be appreciated, many organic molecules, as well as inorganic molecules, form crystals that incorporate water into the crystalline structure without chemical alteration of the organic molecule (water of crystallization). As an example, the sugar trehalose exists in both an anhydrous form (melting point 203° C.) and as a dihydrate (melting point 97° C.). Protein crystals often have as much as 50% water content. In gas hydrates, water molecules form a loose framework around the gas molecule, which is usually methane.

As another example, the heat-responsive water-releasing substance 102A can comprise a salt compound that is compounded with hydrogen peroxide, such as, for example, sodium percarbonate (Na$_2$CO$_3$ 1.5H$_2$O$_2$), carbamide peroxide (CH$_6$N$_2$O$_{32}$, which can be written more specifically as (NH$_2$)$_2$CO·H$_2$O$_2$), or sodium perborate tetrahydrate (NaBO$_3$·4H$_2$O).

As another example, the heat-responsive water-releasing substance 102A can comprise a superabsorbent polymer (e.g., a polymer that is capable of absorbing and holding large amounts of water and, when heated, release water vapor). Examples include cross-linked polyacrylates and polyacrylamides, cellulose- or starch-acrylonitrile graft copolymers, and cross-linked maleic anhydride copolymers.

As another example, the heat-responsive water-releasing substance 102A can comprise a porous structure material such as zeolite (e.g., a crystalline aluminosilicate mineral with a porous structure that can absorb and release water molecules).

As another example, the heat-responsive water-releasing substance 102A can comprise a silica gel (e.g., a porous and amorphous form of silicon dioxide that can release water when heated).

As yet another example, the heat-responsive water-releasing substance 102A can comprise montmorillonite (e.g., a type of clay with high water absorption capacity that, when heated, can release the water it has absorbed).

As another example, the heat-responsive water-releasing substance 102A can comprise a hydrogel (a three-dimensional network of hydrophilic polymers) that is capable of releasing water when exposed to heat.

As another example, the heat-responsive water-releasing substance 102A can comprise lithium chloride, which is a hygroscopic salt that can absorb water vapor from the air and, when heated, release water.

As yet another example, the heat-responsive water-releasing substance 102A can comprise a metal-organic framework (MOF) that exhibits hygroscopic behavior and can absorb water molecules and, when subjected to heat, release the captured water.

Figure 6A:
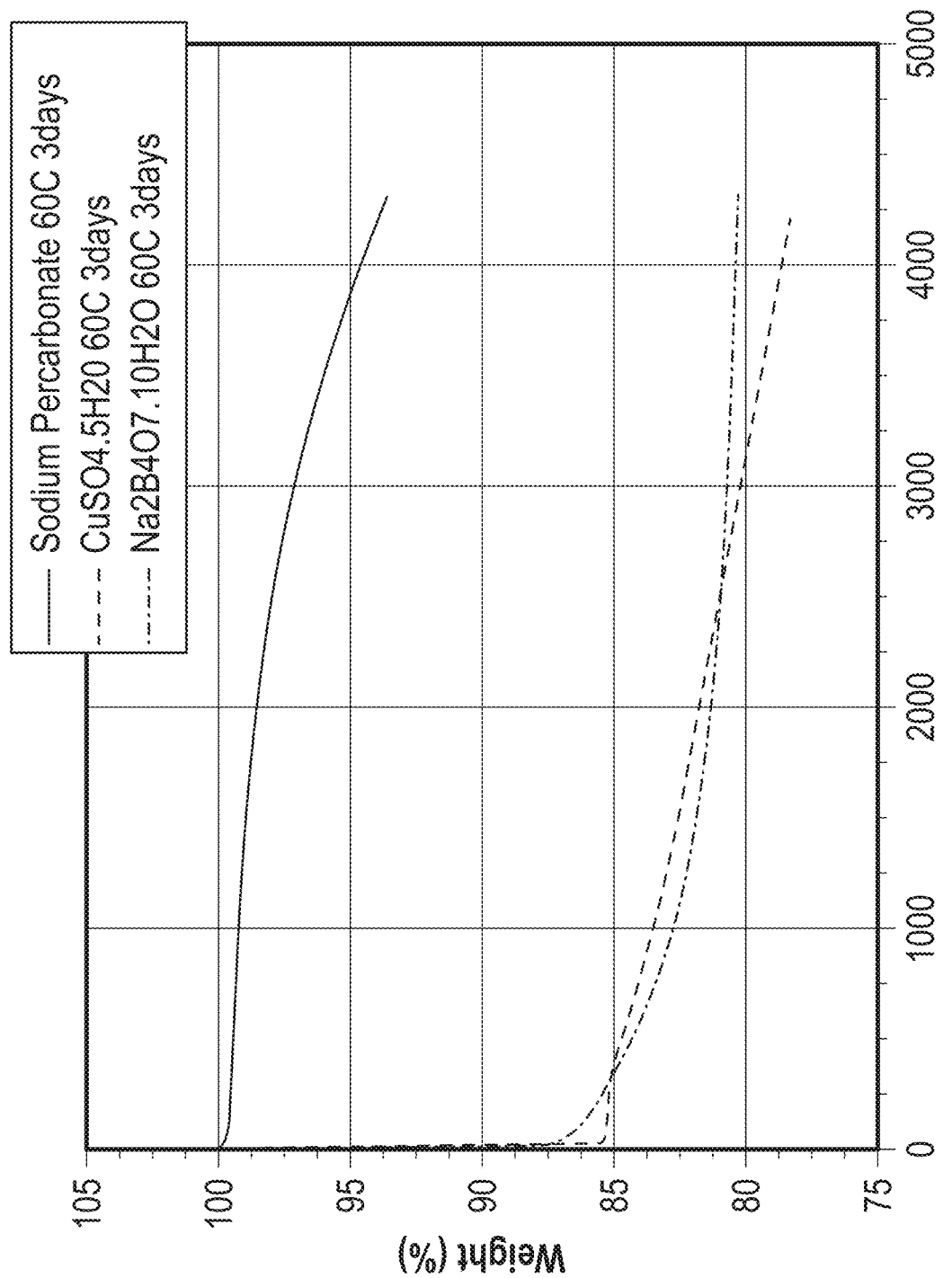
FIG. 6A is a plot showing the release of water of three examples of heat-responsive water-releasing substance as a function of time.

FIG. 6A is a plot showing the release of water of three examples of heat-responsive water-releasing substance 102A as a function of time. Specifically, FIG. 6A plots the weight (%) of the heat-responsive water-releasing substance 102A as a function of time at 60 degrees Celsius for sodium percarbonate (Na$_2$CO$_3$·1.5H$_2$O$_2$), copper(II) sulfate pentahydrate (CuSO$_4$·5H$_2$O), and sodium tetraborate decahydrate (Na$_2$B$_4$O$_7$·10H$_2$O). As shown in FIG. 6A, for sodium percarbonate (Na$_2$CO$_3$ 1.5H$_2$O), after three days (4,320 minutes) at 60 degrees Celsius, the weight is down to about 93.5%. Of this weight loss, approximately 3% is oxygen (O$_2$), and approximately 3.5% is water. It will be appreciated that the curves in FIG. 6A can change for different temperatures. For example, by increasing the temperature, the rate of weight loss can be increased. As specific examples, for sodium percarbonate (Na$_2$CO$_3$·1.5H$_2$O$_2$), after three days (4,320 minutes) at temperatures of 80 degrees Celsius or above, around 15% of the weight loss is due to water being released.

Figure 6B:
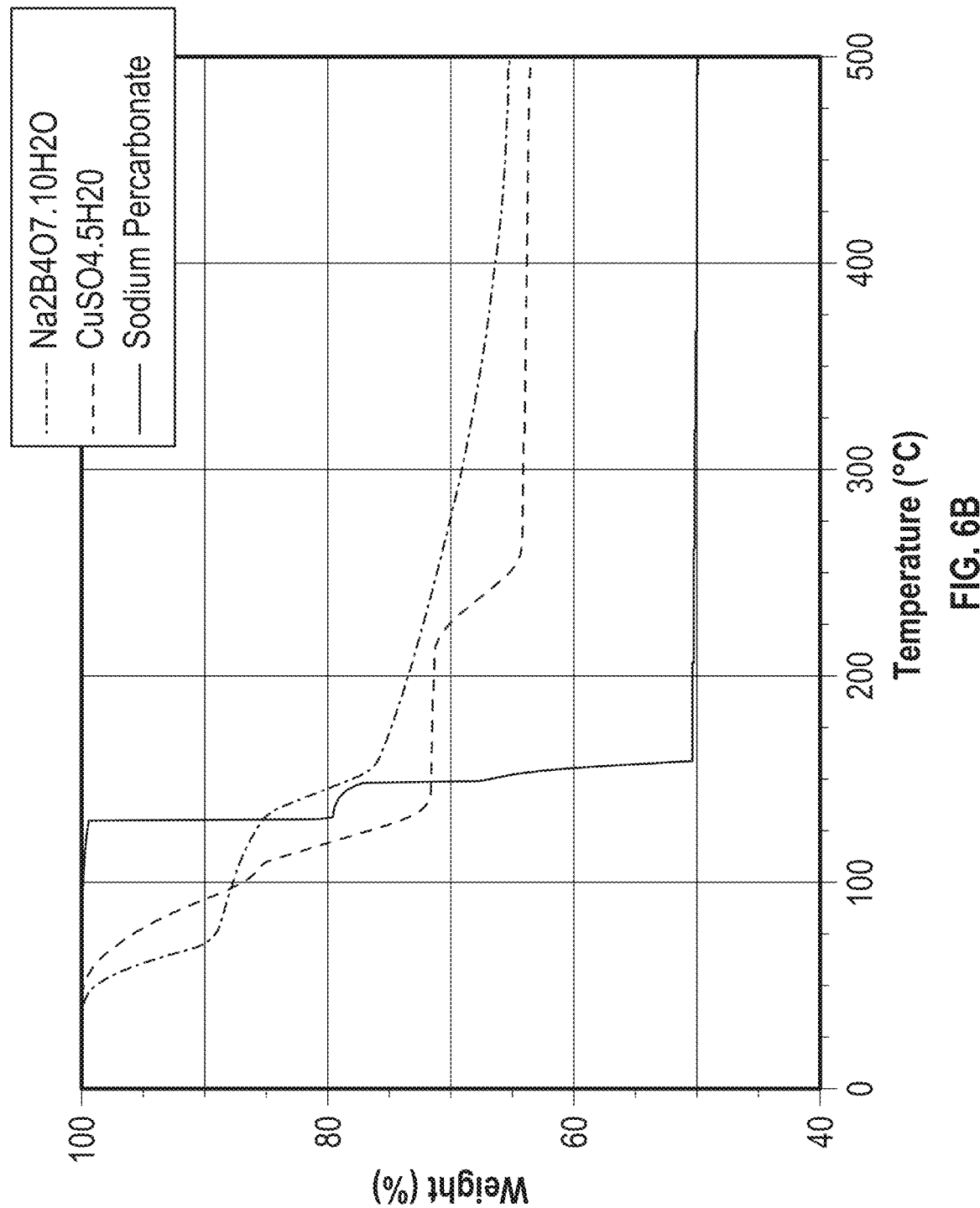
FIG. 6B is a plot illustrating the impact of temperature on the water-releasing characteristics of the three examples of the heat-responsive water-releasing substance shown in FIG. 6A.

FIG. 6B is a plot illustrating the impact of temperature on the water-releasing characteristics of the three examples of the heat-responsive water-releasing substance 102A shown in FIG. 6A. Specifically, FIG. 6B shows weight (%) as a function of temperature. Data for each curve was generated by increasing the temperature of the heat-responsive water-releasing substance 102A in an open pan by 10 degrees Celsius per minute. As shown, sodium percarbonate (Na$_2$CO$_3$·1.5H$_2$O$_2$) loses little weight at temperatures below about 110 degrees Celsius. Between about 110 degrees and about 125 degrees, the weight loss is small, meaning that a small amount of water is released. Almost all of the weight loss occurs between about 125 degrees and 160 degrees, which means that almost all of the water is released at temperatures in this range. Both copper(II) sulfate pentahydrate (CuSO$_4$·5H$_2$O) and sodium tetraborate decahydrate (Na$_2$B$_4$O$_7$·10H$_2$O) have less drastic weight losses, and both begin to release water at lower temperatures than sodium percarbonate.

Thus, FIG. 6B indicates that sodium percarbonate (Na$_2$CO$_3$·1.5H$_2$O$_2$) might be a good choice as the heat-responsive water-releasing substance 102A if step-like water-release behavior is desirable (e.g., little or no water is released at temperatures below a critical temperature, and there is a more substantial water release at temperatures above the critical temperature). For example, if the ordinary operating temperature of the data storage device 500 is 60 degrees Celsius, the use of sodium percarbonate (Na$_2$CO$_3$·1.5H$_2$O), situated in a location within the data storage device 500 that experiences the ordinary operating temperature unless deliberately heated, could result in the heat-responsive water-releasing substance 102A releasing only a small amount of water at a slow rate under ordinary operating temperatures (e.g., the heat-responsive water-releasing substance 102A would not release a substantial amount of water under ordinary operating conditions). To cause the heat-responsive water-releasing substance 102A to release a more substantial amount of water, the heater 135 can be used to heat the heat-responsive water-releasing substance 102A (assumed to be sodium percarbonate (Na$_2$CO$_3$·1.5H$_2$O$_2$)) to above a threshold (or critical) temperature (e.g., 110 degrees Celsius, 125 degrees Celsius, etc.) at which it will release the desired amount of water. It is to be appreciated that a water-absorbing material 210 (e.g., desiccant, CaO$_2$, MgO$_2$, Na$_2$O$_2$, etc.) can be included to provide an additional mechanism to control the humidity within the data storage device 500 (e.g., to control the effective rate and/or amount of water released by the heat-responsive water-releasing substance 102A).

The use of copper(II) sulfate pentahydrate (CuSO$_4$·5H$_2$O) or sodium tetraborate decahydrate (Na$_2$B$_4$O$_7$·10H$_2$O) as the heat-responsive water-releasing substance 102A might be preferred if finer control of the amount of water released is desirable, and/or if it is desirable to release water at lower operating temperatures. For example, both copper(II) sulfate pentahydrate (CuSO$_4$·5H$_2$O) and sodium tetraborate decahydrate ($Na_2B_4O_7 \cdot 10H_2O$) release water at 75 degrees Celsius, with sodium tetraborate decahydrate ($Na_2B_4O_7 \cdot 10H_2O$) releasing more water than copper(II) sulfate pentahydrate ($CuSO_4 \cdot 5H_2O$) at temperatures below about 100 degrees Celsius, and copper(II) sulfate pentahydrate ($CuSO_4 \cdot 5H_2O$) releasing more water than sodium tetraborate decahydrate ($Na_2B_4O_7 \cdot 10H_2O$) at temperatures above about 100 degrees Celsius.

The quantity and identity of the heat-responsive water-releasing substance 102A (e.g., which material or combination of materials, etc., and how much of it to include in the data storage device 500) can be design parameters for the data storage device 500, and they can be selected based on a variety of factors. These factors may include, for example, the maximum relative humidity that is expected to be desirable over the lifetime of the data storage device 500, the expected lifetime of the data storage device 500, the rate or speed at which water release is desirable, the expected operating temperature of the data storage device 500 in the location where the heat-responsive water-releasing substance 102A is to be situated, and/or the amount by which (or temperature to which) the heater 135 can increase the temperature of the heat-responsive water-releasing substance 102A. Determining the identity and quantity of the heat-responsive water-releasing substance 102A for a particular data storage device 500 will be within the level of ordinary skill in the art in light of the teachings herein.

Referring again to FIG. 5, the water-absorbing material 210 is provided to absorb water, which allows the data storage device 500 to return to a drier condition after the relative humidity has been increased by water emitted by the water-releasing substance 102 in the container 105. The water-absorbing material 210 was described above in the discussion of FIG. 3. That description applies to FIG. 5 and is not repeated here.

If present, the sensor 170 monitors the humidity inside of the data storage device 500. The humidity can be detected in any suitable way (e.g., mixing ratio, relative humidity, absolute humidity, etc.). The sensor 170 can be, for example, a hygrometer. The sensor 170 can be physically and/or communicatively coupled to the controller 115 to provide information about the humidity (e.g., measurements, sensed humidity levels, etc.) to the controller 115.

As explained above, the heater 135 is coupled to and/or situated near the container 105. The heater 135 and container 105 are situated inside of the data storage device 500 such that the heater 135 can heat the heat-responsive water-releasing substance 102A to cause it to release water and thereby increase the relative humidity. The heater 135 can be provided specifically for the active humidity adjustment system 100, or the heater 135 can be an existing component of the data storage device 500 that can be used by the active humidity adjustment system 100 to generate sufficient heat to cause the heat-responsive water-releasing substance 102A to release water.

The heater 135 is physically and/or communicatively coupled to and controlled by the controller 115. The controller 115 was described above in the discussion of FIG. 3. That description also applies to the controller 115 of FIG. 5 and is not repeated here.

In the active humidity adjustment system 100A, the controller 115 is responsible for controlling the heater 135. The controller 115 may monitor for a trigger condition and then cause the heater 135 to generate heat to cause the heat-responsive water-releasing substance 102A to release water when it is desirable for the humidity to be increased. The trigger condition can be any suitable condition. As an example, when the active humidity adjustment system 100A includes the sensor 170, the controller 115 can monitor the sensed humidity and, when the humidity is too low, turn on the heater 135 to increase the relative humidity. As another example, the controller 115 can monitor the operation of the data storage device 500 and cause the heater 135 to heat the heat-responsive water-releasing substance 102A in response to detecting a trigger condition. As a specific example, the controller 115 can identify when the data storage device 500 is performing an operation in which it is expected or known that higher relative humidity would be helpful (e.g., during more intensive writing operations, during on-track dwelling, during ATI refresh operations, etc.). The controller 115 can, for example, be aware of commands and/or instructions sent to the recording head 529 (e.g., by monitoring a communication channel) and control the heater 135 in response to the content or occurrence of those commands and/or instructions.

As another example, another component (e.g., a processor) of the data storage device 500 (e.g., on the chip 550) can inform the controller 115 that additional humidity is warranted (e.g., by writing a value to a register that the controller 115 reads), and the controller 115 can detect the command to increase the humidity (e.g., by reading the register). In this way, the processor can instruct the controller 115 to increase the relative humidity, and the controller 115 can detect the instruction and control the heater 135 to increase the humidity. Thus, the controller 115 can actively monitor for the trigger condition (e.g., by monitoring measurements from the sensor 170, by observing communications associated with the recording head 529, etc.), or the trigger condition can be an instruction given to the controller 115.

Figure 7:
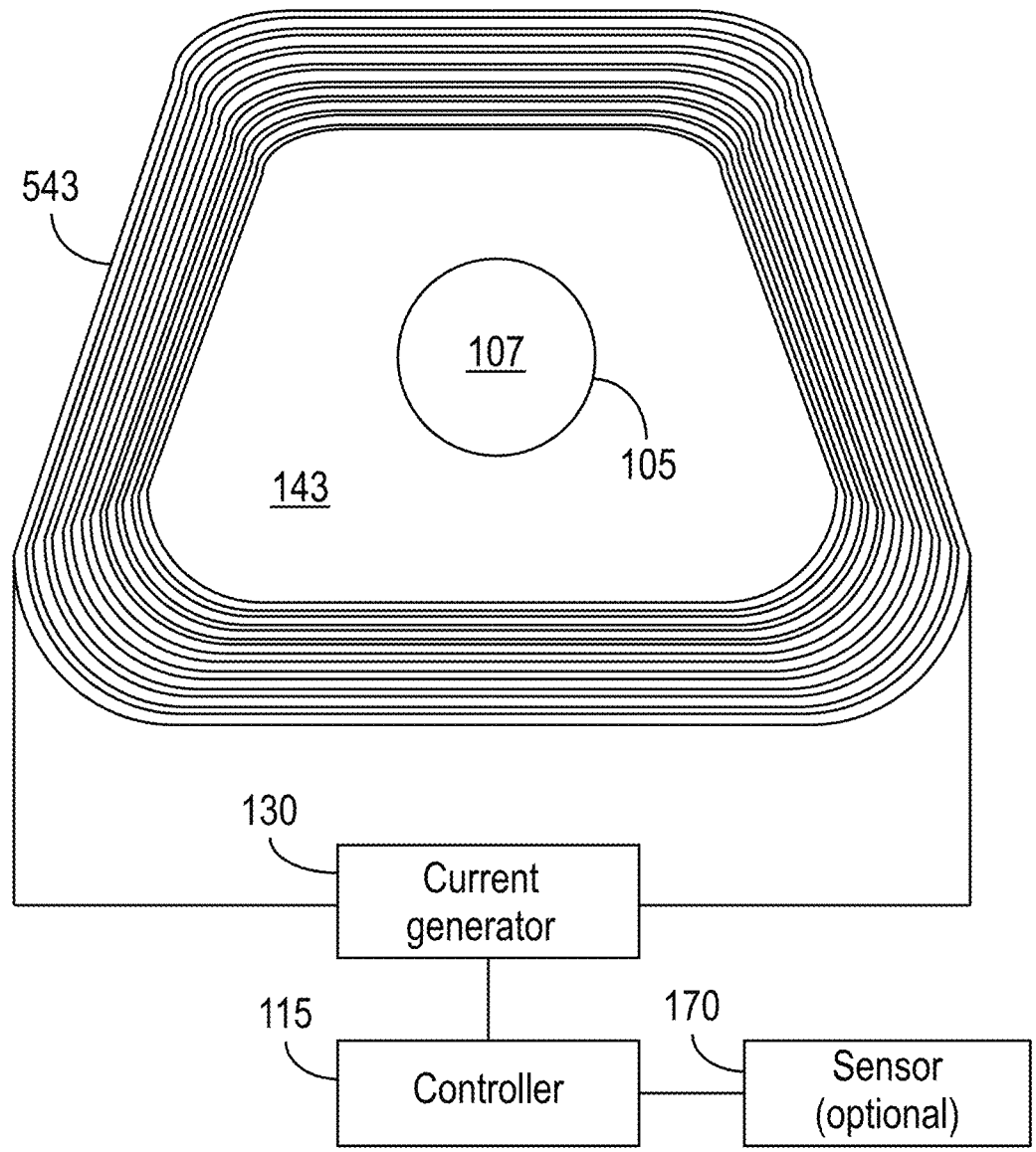
FIG. 7 is a diagram of an example in which the heat-responsive water-releasing substance is heated by the voice coil winding of the data storage device in accordance with some embodiments.

As explained above, in some embodiments, the heater 135 is a dedicated component provided only for the active humidity adjustment system 100. In other embodiments, the heater 135 is implemented using existing components of the data storage device 500. FIG. 7 is a diagram of an example in which the heat-responsive water-releasing substance 102A is heated by the voice coil 543 winding of the data storage device 500 in accordance with some embodiments. As shown in FIG. 7, the container 105 (and, therefore, the heat-responsive water-releasing substance 102A) can be situated within a core area 143 of the voice coil 543 winding of the data storage device 500. When current flows through the voice coil 543 winding, the core area 143 is heated due to resistive heating (i.e., the current encounters resistance as it passes through the metal voice coil 543 winding, which causes the metal to heat up and heat the area around it). Current flow through the voice coil 543 winding occurs as a matter of course as the data storage device 500 operates (e.g., when it is seeking). Thus, the heat naturally generated by the voice coil 543 during the ordinary operation of the data storage device 500 (e.g., during seeking operations) may be able to heat the heat-responsive water-releasing substance 102A to cause it to release water. It is to be appreciated that a water-absorbing material 210 (e.g., desiccant, $CaO_2$, $MgO_2$, $Na_2O_2$, etc.) can be included to provide an additional mechanism to control the humidity within the data storage device 500 (e.g., to control the effective rate and/or amount of water released by the heat-responsive water-releasing substance 102A).

In some embodiments, the controller 115 controls the current generator 130 to cause current (or additional current) to flow through the winding of the voice coil 543 when the data storage device 500 is in an idle state in order to heat the core area 143. The controller 115 can ensure that the current flowing through the voice coil 543 is sufficient to heat the heat-responsive water-releasing substance 102A above a critical temperature to cause the heat-responsive water-releasing substance 102A to release water. The current can be in addition to current flowing through the voice coil 543 for ordinary data storage device 500 operation. In other words, to cause current to flow through the winding of the voice coil 543, the controller 115 can either increase the current already flowing through the voice coil 543 winding, or it can cause a specified amount of current to flow (e.g., from zero current to a nonzero current sufficient to heat the heat-responsive water-releasing substance 102A to cause it to release water).

Thus, the controller 115 can cause current (or additional current) to flow through the voice coil 543 winding for the purpose of heating the core area 143 in order to heat the heat-responsive water-releasing substance 102A and cause it to release water. The controller 115 can determine how much current (or additional current) to apply to the voice coil 543 winding, and for how long, to cause the heat-responsive water-releasing substance 102A to release water to increase the humidity by a desired amount. As explained above, the active humidity adjustment system 100A may optionally include a sensor 170, in which case the controller 115 can determine when and for how long to apply current (or additional current) to the voice coil 543 in order to release a desired amount of water vapor. In addition or alternatively, the controller 115 may be pre-programmed to control the current generator 130 in a predetermined way (e.g., to cause it to generate a specified amount of (additional) current for a specified amount of time to increase the humidity by a target amount whenever additional humidity is desirable).

The method 300 and the method 350 can be implemented using a configuration such as that shown in FIG. 5 or FIG. 7. For example, when the container 105 is situated in the core area 143 of the voice coil 543 winding, at block 308 and/or block 314 of the method 300, and/or at block 358 of the method 350, heat can be provided for a suitable length of time by the voice coil 543 winding.

Groups of Two or More Chemicals That, When Mixed Together, Release Water

In some embodiments, the active humidity adjustment system 100, method 300, and/or method 350 use mixing of a group of two or more chemicals to provoke a chemical reaction that releases water. The reaction can be temperature-insensitive, or it can be heat-sensitive (heat-responsive). For example, the group of two or more chemicals can release water when mixed across the entire range of operating temperatures expected inside of the data storage device 500. In some embodiments, heat can be applied to provoke or control the reaction or the rate and/or quantity of water released when the group of two or more chemicals is mixed together. By controlling when the two or more chemicals are mixed and the quantities of the two or more chemicals that are mixed, the humidity can be adjusted.

Referring again to FIG. 3, the water-releasing substance 102 can be a mixture of chemicals and/or substances, which can allow the characteristics of the water-releasing substance 102 to be adjusted. For example, when the water-releasing substance 102 comprises a moisture-releasing chemical (such as, for example, sodium percarbonate ($Na_2CO_3 \cdot 1.5H_2O_2$), carbamide peroxide ($CH_6N_2O_3$, which can be written more specifically as $(NH_2)_2CO \cdot H_2O_2$), or sodium perborate tetrahydrate ($NaBO_3 \cdot 4H_2O$), a superabsorbent polymer, etc.), the water-releasing speed of the water-releasing substance 102 can be adjusted by mixing two or more water-releasing chemical(s) and/or mixing the water-releasing chemical(s) with one or more water-absorbing chemicals (e.g., $CaO_2$, $MgO_2$, $Na_2O_2$, etc.). The water-releasing isotherm can also be adjusted by pre-conditioning the water-releasing substance 102 (e.g., mixing it with other chemicals).

Figure 8:
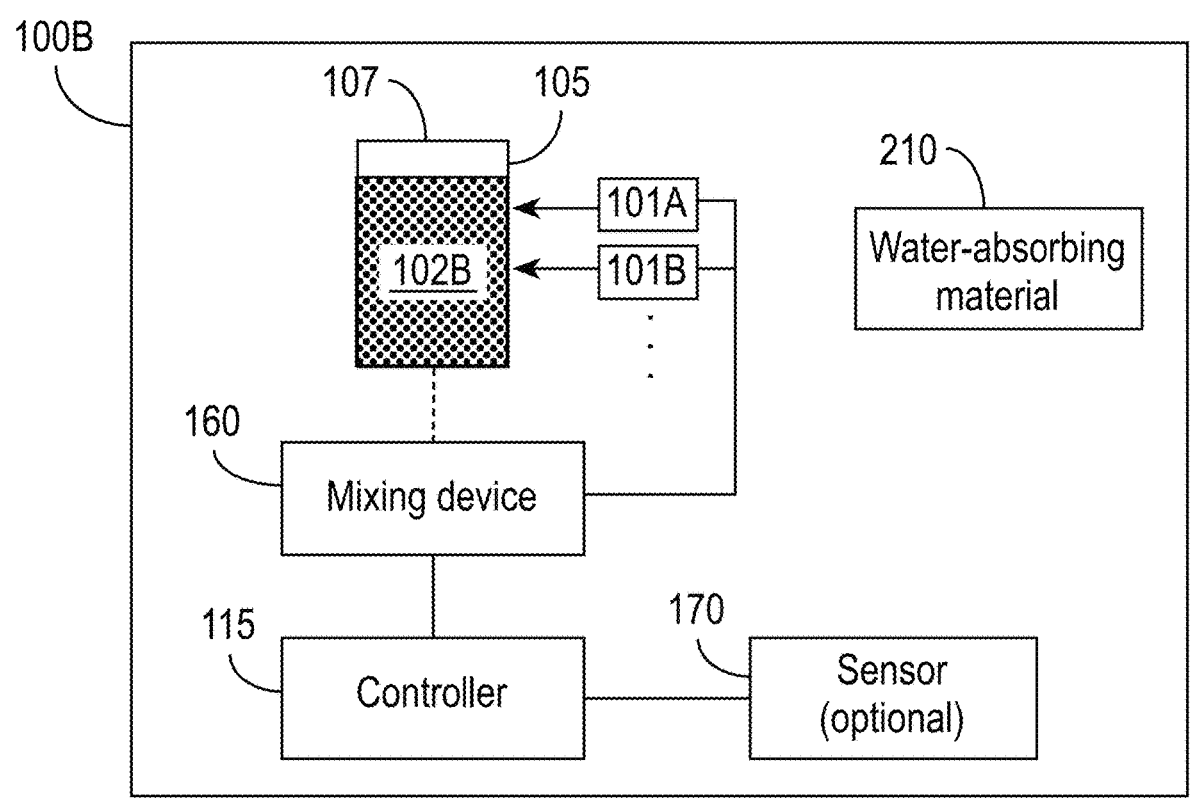
FIG. 8 is a diagram showing components of an active humidity adjustment system that uses, as the water-releasing substance, a mixture of two or more chemicals that releases water in accordance with some embodiments.

FIG. 8 is a diagram showing components of an active humidity adjustment system 100B that uses, as the water-releasing substance 102, a mixture of two or more chemicals 102B that releases water in accordance with some embodiments. The active humidity adjustment system 100B includes a container 105, a mixing device 160, a controller 115, a water-absorbing material 210, and, optionally, a sensor 170. Comparing FIG. 8 to FIG. 3, the water-releasing substance 102 is the mixture of two or more chemicals 102B, the water-release provocation device 150 is the mixing device 160, and the trigger condition can be provided by the sensor 170 (if present).

The controller 115 is physically and/or communicatively coupled to mixing device 160 and, if present, the sensor 170. The mixing device 160 is responsible for mixing at least two chemicals as the mixture of two or more chemicals 102B. FIG. 8 illustrates a first chemical 101A and a second chemical 101B. (It is to be appreciated that although the singular "chemical" is used to refer to the first chemical 101A and the second chemical 101B, each of the first chemical 101A and/or the second chemical 101B can be a single chemical or a combination of chemicals.) Ellipses are shown to indicate that there can be additional chemicals mixed together for the two or more chemicals 102B. The vertical dashed line between the mixing device 160 and the container 105 in FIG. 8 indicates that mixing device 160 may be in contact with (e.g., physically connected to) the container 105, or it may merely be in the vicinity of the container 105 such that the mixing device 160 can act on the mixture of two or more chemicals 102B.

The mixing device 160 can comprise any device capable of creating the mixture of two or more chemicals 102B. For example, the mixing device 160 can comprise a peristaltic pump, syringe pump, automatic burette, microfluidic system, dosing pump, or any suitable mechanism that can combine the first chemical 101A, second chemical 101B, etc. to create the mixture of two or more chemicals 102B. The mixing device 160 can be in a simple configuration in which the mixture of two or more chemicals 102B is created by one or more chemicals being dripped into one or more other chemicals (e.g., the first chemical 101A dripped into the second chemical 101B, etc.). Alternatively or in addition, the mixing device 160 can be capable of pushing the first chemical 101A, second chemical 101B, etc. into the container 105 and/or stirring/agitating the contents of the container 105.

The mixing device 160 can be configured to mix the two or more chemicals 102B in various amounts to provide desired amounts of additional humidity. For example, the mixing device 160 can be capable of mixing together different quantities of the two or more chemicals 102B in response to current humidity requirements (e.g., the mixing device 160 can be configured to mix together larger quantities of the two or more chemicals 102B to produce more water on demand). As another example, the quantities of the two or more chemicals 102B may be mixed together in pre-determined quantities (e.g., a quantity A of the first chemical 101A is always mixed with a quantity B of the second chemical 101B, in which case two mixing cycles can be completed to provide twice as much water as one mixing cycle). By setting and/or adjusting the amounts of and ratios between the individual chemicals in the mixture of two or more chemicals 102B, the rate of water release can be adjusted to match a target humidity for the data storage device 500.

The container 105 contains the mixture of two or more chemicals 102B and has a membrane 107 through which water molecules released by the mixture of two or more chemicals 102B can exit the container 105. The membrane 107 is configured to prevent the mixture of two or more chemicals 102B itself from leaving the container 105. In other words, the membrane 107 is permeable to released water molecules but impermeable to the mixture of two or more chemicals 102B itself.

The mixture of two or more chemicals 102B can comprise any suitable chemicals that, when mixed, release water. There are many possible groups of two or more chemicals that, when mixed together, release water. For example, when acids react with carbonates, such as calcium carbonate, a salt, water, and carbon dioxide are made ($CaCO_3 + 2HCl \rightarrow CaCl_2 + CO_2 + H_2O$). As another example, a base plus an acid can produce water. Sodium hydroxide reacts with protic acids to produce water and the corresponding salts. For example, when sodium hydroxide reacts with hydrochloric acid, sodium chloride is formed: $NaOH(aq) + HCl(aq) \rightarrow NaCl(aq) + H_2O(l)$. As another example, a burning hydrogen-containing material can produce oxygen such as in a reaction between hydrogen gas and oxygen gas, which produces water. This reaction is known as the combustion of hydrogen. The chemical equation for this reaction is $2H_2 + O_2 \rightarrow 2H_2O$. Methane burns to give off carbon dioxide ($CO_2$) and water ($H_2O$). Another example is dehydration synthesis, in which one reactant gives up an atom of hydrogen and another reactant gives up a hydroxyl group (OH) in the synthesis of a new product. In the formation of their covalent bond, a molecule of water is released as a byproduct.

Another example is oxides plus acid. For example, metal oxide is a compound that contains metal chemically combined with oxygen. These compounds are basic in nature. Therefore, when a metal oxide reacts with an acid, it forms a salt with water. For example (Acid+Metal Oxide→Metal Salt+Water):

Hydrochloric Acid+Lithium Oxide–Lithium Chloride+Water 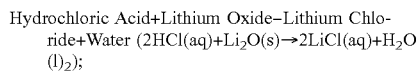

Hydrochloric Acid+Iron (III) Oxide Iron (III) Chloride+Water 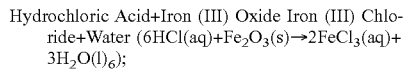

Sulphuric Acid+Potassium Oxide–Potassium Sulphate+Water 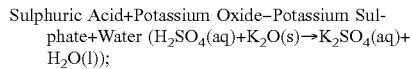

Sulphuric Acid+Aluminium Oxide–Aluminium Sulphate+Water 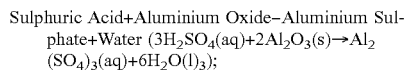

Nitric Acid+Magnesium Oxide–Magnesium Nitrate+Water 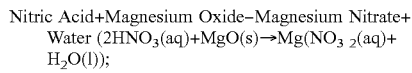

Nitric Acid+Titanium (III) Oxide–Titanium (III) Nitrate+Water 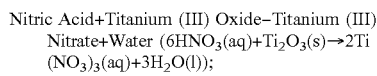

Ethanoic Acid+Sodium Oxide–Sodium Ethanoate+Water 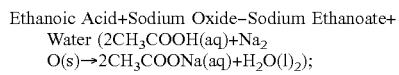

Ethanoic Acid+Calcium Oxide–Calcium Ethanoate+Water 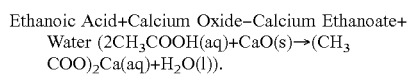

The quantities and identities of the group of two or more chemicals used to create the mixture of two or more chemicals 102B heat-responsive water-releasing substance 102A (e.g., which chemicals or combination of chemicals, etc., and how much of them to include in the data storage device 500) can be design parameters for the data storage device 500, and they can be selected based on a variety of factors. These factors may include, for example, the maximum relative humidity that is expected to be desirable over the lifetime of the data storage device 500, the expected lifetime of the data storage device 500, the rate or speed at which water release is desirable, the expected operating temperature of the data storage device 500 in the location where the mixture of two or more chemicals 102B is to be created, and/or the temperature sensitivity/responsiveness of the mixture of two or more chemicals 102B. Determining the identities and quantities of the first chemical 101A, the second chemical 101B, etc. for a particular data storage device 500 will be within the level of ordinary skill in the art in light of the teachings herein.

As a specific example, the mixture of water-releasing substance 102 may include sodium percarbonate and calcium peroxide. As explained herein, sodium percarbonate alone can release water. Mixing sodium percarbonate with calcium peroxide can slow down the speed/rate of water release significantly. Therefore, including sodium percarbonate and calcium peroxide in the mixture of two or more chemicals 102B may provide a good level of control at ordinary operating temperatures of the data storage device 500.

As another example, the mixture of two or more chemicals 102B may include $CuSO_4 \cdot 3H_2O$ and $CuSO_4 \cdot 2H_2O$.

As another example, the mixture of two or more chemicals 102B may include $CuSO_4 \cdot 3H_2O$ and $CuSO_4 \cdot H_2O$.

As yet another example, the mixture of two or more chemicals 102B may include $Na_2B_4O_7 \cdot 7H_2O$, which may slowly decompose into $Na_2B_4O_7 \cdot 3H_2O$ at ordinary operating temperatures of the data storage device 500.

As explained above, by controlling the quantities of the two or more chemicals (or combinations of chemicals) that are mixed together, and the speed/rate at which the chemicals (or combinations of chemicals) are mixed, the speed/rate of water release can be controlled either on-the-fly or in a predetermined manner (e.g., during the data storage device 500 design process).

The water-absorbing material 210 is provided to absorb water, which allows the data storage device 500 to return to a drier condition after the relative humidity has been increased by water emitted by the mixture of two or more chemicals 102B. The water-absorbing material 210 was described above in the discussion of FIG. 3. That description applies to FIG. 8 and is not repeated here.

If present, the sensor 170 monitors the humidity inside of the data storage device 500. The humidity can be detected in any suitable way (e.g., mixing ratio, relative humidity, absolute humidity, etc.). The sensor 170 can be, for example, a hygrometer. The sensor 170 can be physically and/or communicatively coupled to the controller 115 to provide information about the humidity (e.g., measurements, sensed humidity levels, etc.) to the controller 115.

The mixing device 160 is physically and/or communicatively coupled to and controlled by the controller 115. The controller 115 was described above in the discussion of FIG. 3. That description also applies to the controller 115 of FIG. 8 and is not repeated here.

In the active humidity adjustment system 100B, the controller 115 is responsible for controlling the mixing device 160. The controller 115 may monitor for a trigger condition and then cause the mixing device 160 to mix the first chemical 101A, the second chemical 101B, etc. to create the mixture of two or more chemicals 102B and thereby release water when it is desirable for the humidity to be increased. The trigger condition can be any suitable condition. As an example, when the active humidity adjustment system 100A includes the sensor 170, the controller 115 can monitor the sensed humidity and, when the humidity is too low, control the mixing device 160 (e.g., instruct it to mix preset or controller-determined quantities of the first chemical 101A, the second chemical 101B, etc.) to increase the relative humidity. As another example, the controller 115 can monitor the operation of the data storage device 500 and cause the mixing device 160 to create/refresh/manage the mixture of two or more chemicals 102B in response to detecting a trigger condition. As a specific example, the controller 115 can identify when the data storage device 500 is performing an operation in which it is expected or known that higher relative humidity would be helpful (e.g., during more intensive writing operations, during on-track dwelling, during ATI refresh operations, etc.). The controller 115 can, for example, be aware of commands and/or instructions sent to the recording head 529 (e.g., by monitoring a communication channel) and control the mixing device 160 in response to the content or occurrence of those commands and/or instructions.

As another example, another component (e.g., a processor) of the data storage device 500 (e.g., on the chip 550) can inform the controller 115 that additional humidity is warranted (e.g., by writing a value to a register that the controller 115 reads), and the controller 115 can detect the command to increase the humidity (e.g., by reading the register). In this way, the processor can instruct the controller 115 to increase the relative humidity, and the controller 115 can detect the instruction and control the mixing device 160 to increase the humidity. Thus, the controller 115 can actively monitor for the trigger condition (e.g., by monitoring measurements from the sensor 170, by observing communications associated with the recording head 529, etc.), or the trigger condition can be an instruction given to the controller 115.

The method 300 and the method 350 can be implemented using a configuration such as that shown in FIG. 8.

As explained above, sodium percarbonate and calcium peroxide ($CaO_2$) can be mixed together in appropriate quantities and ratios to produce a desired relative humidity. FIG. 9 is a table showing examples of amounts and ratios of sodium percarbonate and $CaO_2$ that can be mixed in a 120 cc container 105 in accordance with some embodiments. Note that FIG. 9 indicates that the humidity can be negative (e.g., "−3% humidity"), meaning that the mixture can serve not only as a source of water, but also as a desiccant to absorb water. In other words, a mixing device 160 can tune the quantities and ratios of sodium percarbonate and $CaO_2$ mixed together to add or remove water as desired as the data storage device 500 operates.

As another example, a group of two or more chemicals that, when mixed together, release water can be included in the data storage device 500 along with a mixing device 160 that combines the chemicals automatically to produce the mixture of two or more chemicals 102B according to a pre-programmed algorithm (e.g., at a particular rate, in particular quantities, at particular times, etc.), as a matter of course (as opposed to in response to a trigger condition) as the data storage device 500 operates.

It is to be appreciated that in addition to, or as an alternative to, the active humidity adjustment techniques described above, passive adjustments (e.g., that do not include a controller 115) are possible. For example, it is possible to include in a data storage device 500 at the time of manufacture a water-releasing substance 102 (e.g., a heat-responsive water-releasing substance 102A and/or mixture of two or more chemicals 102B) that, under conditions expected to occur when the data storage device 500 operates, will adjust the humidity substantially as expected in an automatic way, as a matter of course. For example, a heat-responsive water-releasing substance 102A can be situated in the core area of the VCM, where it will be heated and release water as a matter of course as the data storage device 500 operates normally. For example, by including particular water-releasing substance 102 in particular amounts in a data storage device 500, it is possible to release target amounts of water at a predictable rate at temperatures expected to be present in the data storage device 500 without the use of heat. For example, $CuSO_4 \cdot 3H_2O$, $CuSO_4 \cdot 2H_2O$, and/or $CuSO_4 \cdot H_2O$ may be options to release water slowly over time at expected operating temperatures of the data storage device 500. As another example, $Na_2B_4O_7 \cdot 7H_2O$ may be included in the data storage device 500. The $Na_2B_4O_7 \cdot 7H_2O$ may slowly decompose into $Na_2B_4O_7 \cdot 3H_2O$ at ordinary operating temperatures of the data storage device 500.

In the foregoing description and in the accompanying drawings, specific terminology has been set forth to provide a thorough understanding of the disclosed embodiments. In some instances, the terminology or drawings may imply specific details that are not required to practice the invention.

The terms "substance" and "material" are used interchangeably herein, unless context indicates otherwise.

The terms "humidity" and "relative humidity" are both used herein. Humidity refers to the amount of water vapor present in the air (or other environment), and it is often expressed in grams of water vapor per cubic meter ($g/m^3$) or as a percentage. Humidity can be measured as absolute humidity (the actual amount of water vapor in the air) or specific humidity (the mass of water vapor per unit mass of air). Relative humidity is a measure of the amount of water vapor in the air compared to the maximum amount of water vapor that the air could hold at a particular temperature. Relative humidity is expressed as a percentage, and it is calculated as the ratio of the actual water vapor pressure to the saturation water vapor pressure at a given temperature, multiplied by 100. A relative humidity of 100% means the air is saturated with moisture and cannot hold any more, while a lower percentage indicates the air is not fully saturated. It will be appreciated that unless the relative humidity is 100%, both the humidity and the relative humidity can be increased. Accordingly, the terms "humidity" and "relative humidity" are used interchangeably herein.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures. Two elements that are coupled together can be physically and/or communicatively coupled.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As another example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A method of adjusting a humidity within an interior of an enclosure of a data storage device, the method comprising:
    detecting a trigger condition;
    in response to detecting the trigger condition, mixing together two or more chemicals or combinations of chemicals situated within the interior of the enclosure of the data storage device to create a water-releasing substance; and
    the water-releasing substance releasing water, thereby increasing the humidity within the interior of the enclosure of the data storage device.

2. The method of claim 1, wherein the trigger condition is that a particular amount of time has passed.

3. The method of claim 2, wherein the particular amount of time is an amount of time that (a) the data storage device has been in operation, or (b) a laser of a heat-assisted magnetic recording (HAMR) head has been in operation.

4. The method of claim 1, wherein the trigger condition comprises one or more of:
    a recording head of the data storage device has remained or will remain over a single track of a recording media of the data storage device for a threshold amount of time,
    an ATI refresh command or operation,
    a formatting command or operation,
    the humidity within the interior of the enclosure of the data storage device is below a threshold, or
    a command or instruction.

5. The method of claim 1, wherein at least one of the two or more chemicals or combinations of chemicals comprises at least one of: an acid, a carbonate, a base, a hydroxide, a hydrogen-containing material, a reactant that gives up a hydroxyl group in a synthesis of a new product, or an oxide.

6. The method of claim 1, wherein the two or more chemicals or combinations of chemicals comprise sodium percarbonate ($Na_2CO_3 \cdot 1.5H_2O_2$) and calcium peroxide ($CaO_2$).

7. The method of claim 1, wherein the two or more chemicals or combinations of chemicals comprise (a) $CuSO_4 \cdot 3H_2O$ and (b) $CuSO_4 \cdot 2H_2O$ or $CuSO_4 \cdot H_2O$.

8. The method of claim 1, wherein the two or more chemicals or combinations of chemicals comprise $Na_2B_4O_7 \cdot 7H_2O$.

9. The method of claim 1, further comprising:
    monitoring for the trigger condition.

10. The method of claim 9, wherein monitoring for the trigger condition comprises at least one of: measuring or estimating a current humidity within the interior of the enclosure, monitoring a service time of the data storage device, monitoring an operation time of a laser of a heat-assisted magnetic recording (HAMR) head of the data storage device, monitoring a communication channel for an instruction, or reading a register.

11. A data storage device, comprising:
    a mixing device configured to mix two or more chemicals or combinations of chemicals to provoke a chemical reaction that releases water; and
    a controller configured to, in response to an occurrence of a trigger condition, cause the mixing device to mix the two or more chemicals or combinations of chemicals to provoke the chemical reaction that releases water, thereby increasing a humidity within the data storage device.

12. The data storage device recited in claim 11, wherein the two or more chemicals or combinations of chemicals comprise at least one of: an acid, a carbonate, a base, a hydroxide, a hydrogen-containing material, a reactant that gives up a hydroxyl group in a synthesis of a new product, or an oxide.

13. The data storage device recited in claim 11, wherein the two or more chemicals or combinations of chemicals comprise at least one of sodium percarbonate ($Na_2CO_3 \cdot 1.5H_2O_2$), calcium peroxide ($CaO_2$), or magnesium peroxide ($MgO_2$).

14. The data storage device recited in claim 11, wherein the two or more chemicals or combinations of chemicals comprise sodium percarbonate ($Na_2CO_3 \cdot 1.5H_2O_2$) and calcium peroxide ($CaO_2$).

15. The data storage device recited in claim 11, wherein the two or more chemicals or combinations of chemicals comprise (a) $CuSO_4 \cdot 3H_2O$ and (b) $CuSO_4 \cdot 2H_2O$ or $CuSO_4 \cdot H_2O$.

16. The data storage device recited in claim 11, wherein the two or more chemicals or combinations of chemicals comprise $Na_2B_4O_7 \cdot 7H_2O$.

17. The data storage device recited in claim 11, wherein the trigger condition comprises passage of a specified amount of time.

18. The data storage device recited in claim 17, wherein the specified amount of time is an amount of time the data storage device is in service, and wherein the controller is further configured to determine the amount of time the data storage device is in service.

19. The data storage device recited in claim 17, wherein the specified amount of time is an operation time of a laser of a heat-assisted magnetic recording (HAMR) head of the data storage device, and wherein the controller is further configured to determine the operation time of a laser of a heat-assisted magnetic recording (HAMR) head of the data storage device.

20. The data storage device recited in claim 11, wherein the trigger condition comprises occurrence of a command, and wherein the controller is further configured to detect or issue the command.

21. The data storage device recited in claim 20, wherein the command comprises an adjacent track interference (ATI) refresh command.

22. The data storage device recited in claim 11, wherein the trigger condition comprises a humidity within an interior of the data storage device being below a threshold, and further comprising a sensor coupled to the controller, wherein the sensor is configured to detect the humidity within the interior of the data storage device.

23. The data storage device recited in claim 11, further comprising:
a water-absorbing material.

24. The data storage device recited in claim 23, wherein the water-absorbing material comprises at least one of a desiccant, calcium peroxide ($CaO_2$), magnesium peroxide ($MgO_2$), sodium peroxide ($Na_2O_2$), or a hydrogel.

* * * * *